US012323265B2

(12) United States Patent
Kim et al.

(10) Patent No.: US 12,323,265 B2
(45) Date of Patent: Jun. 3, 2025

(54) ELECTRONIC DEVICE FOR PROVIDING PERSONALIZED GROUP SERVICE, AND CONTROL METHOD OF SAME

(71) Applicant: Samsung Electronics Co., Ltd., Suwon-si (KR)

(72) Inventors: Sungtaek Kim, Suwon-si (KR); Kyuho Shin, Suwon-si (KR); Pyoje Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/377,446

(22) Filed: Oct. 6, 2023

(65) Prior Publication Data
US 2024/0031187 A1      Jan. 25, 2024

Related U.S. Application Data

(63) Continuation of application No. PCT/KR2022/004481, filed on Mar. 30, 2022.

(30) Foreign Application Priority Data

Apr. 7, 2021 (KR) .......................... 10-2021-0045023

(51) Int. Cl.
*H04L 12/18* (2006.01)

(52) U.S. Cl.
CPC .................. *H04L 12/185* (2013.01)

(58) Field of Classification Search
CPC .................................................. H04L 12/185
(Continued)

(56) References Cited

U.S. PATENT DOCUMENTS 8,639,757 B1 * 1/2014 Zang ....................... G10L 17/04
709/204
8,934,807 B2    1/2015 Takahashi
(Continued)

FOREIGN PATENT DOCUMENTS

JP    2004021411 A    1/2004
JP    2014235656 A    12/2014
(Continued)

OTHER PUBLICATIONS

International Search Report and Written Opinion corresponding to Application No. PCT/KR2022/004481; Mailing Date Jun. 24, 2022; Filing Date Apr. 7, 2021.

*Primary Examiner* — Ruolei Zong
(74) *Attorney, Agent, or Firm* — CANTOR COLBURN LLP

(57) ABSTRACT

Disclosed are an electronic device for providing personalized group service and a control method. The electronic device includes a touchscreen display, communication circuitry, and at least one processor. The at least one processor may be set to: detect at least one external electronic device positioned around the electronic device by the communication circuitry, receive a request for generating a group including the at least one external electronic device and the electronic device, determine, in response to receiving the request, whether a number of communications between the at least one detected external electronic device and the electronic device is at least a pre-designated number, determine a attributes of the group including the at least one external electronic device based on at least the result of the determination and display an indicator, indicating the at least one detected external electronic device, on the touch screen display according to the attribute.

16 Claims, 24 Drawing Sheets

(58) Field of Classification Search
USPC .......................................................... 709/204
See application file for complete search history.

(56) References Cited

U.S. PATENT DOCUMENTS

| | | |
|---|---|---|
| 2010/0281342 A1 | 11/2010 | Chang et al. |
| 2012/0149295 A1 | 6/2012 | Isozu et al. |
| 2012/0290653 A1* | 11/2012 | Sharkey .............. G06F 16/4387 |
| | | 709/204 |
| 2013/0109363 A1 | 5/2013 | Yang et al. |
| 2013/0227455 A1* | 8/2013 | Lee ........................ G06F 16/54 |
| | | 715/769 |
| 2014/0129626 A1* | 5/2014 | Smadi ..................... H04W 4/08 |
| | | 709/204 |
| 2014/0188846 A1 | 7/2014 | Kurabayashi |
| 2014/0220937 A1 | 8/2014 | Kang et al. |
| 2014/0359012 A1 | 12/2014 | Watanabe |
| 2015/0262275 A1 | 9/2015 | Trussel et al. |
| 2015/0326624 A1* | 11/2015 | Rajendran ............. H04W 4/021 |
| | | 709/204 |
| 2016/0162568 A1 | 6/2016 | Lee et al. |
| 2016/0205501 A1 | 7/2016 | Lee et al. |
| 2016/0315986 A1* | 10/2016 | Chen ..................... H04W 12/08 |
| 2019/0306781 A1* | 10/2019 | Do ........................ H04W 4/021 |

FOREIGN PATENT DOCUMENTS

| | | | |
|---|---|---|---|
| KR | 20120107109 A | | 9/2012 |
| KR | 20130097484 A | * | 9/2013 |
| KR | 20140099067 A | | 8/2014 |
| KR | 20150008647 A | | 1/2015 |
| KR | 20150111749 A | | 10/2015 |
| KR | 20150139121 A | | 12/2015 |
| KR | 20160108067 A | | 9/2016 |
| KR | 102007784 B1 | * | 8/2019 |

\* cited by examiner

| Type of group/authority | Group activation | Accessible app | Accessible data | Data expiration date | Device access | Privacy text |
|---|---|---|---|---|---|---|
| First type of group | Off | Gallery | Multimedia | 24hr | None | Inaccessible |
| Second type of group | Auto | Gallery | Multimedia | 24hr | Public device | Inaccessible |
| Third type of group | On | Gallery, Schedule | Multimedia, Files | 6 months | Public device | Inaccessible |
| Fourth type of group | On | All applications | All data | 6 months | Public / Private device | Accessible |

FIG. 10

ELECTRONIC DEVICE FOR PROVIDING PERSONALIZED GROUP SERVICE, AND CONTROL METHOD OF SAME

CROSS-REFERENCE TO RELATED APPLICATIONS

This application is a continuation of International Application No. PCT/KR2022/004481 filed on Mar. 30, 2022, designating the United States, in the Korean Intellectual Property Receiving Office, and claiming priority to Korean Patent Application No. 10-2021-0045023 filed on Apr. 7, 2021, the disclosures of which are all hereby incorporated by reference herein in their entireties.

BACKGROUND

1. Technical Field

The disclosure relates to an electronic device for providing a personalized group service and a control method therefor.

2. Description of Related Art

Various services and additional functions provided via an electronic device, for example, a portable electronic device such as a smartphone, have been gradually increased. To increase the effective value of such an electronic device, and to satisfy various desires of users, communication service providers or electronic device manufacturers have provided various functions, and have competitively developed an electronic device distinguished from other companies. Accordingly, various functions provided via an electronic device have been gradually advanced.

In order to produce (i.e., configure) a set (also referred to as a "group" in this document) of a plurality of electronic devices to share data stored in a predetermined electronic device (e.g., accessing a cloud server via a predetermined application (e.g., a Samsung® account application, a Samsung® cloud application, or an application providing a service related to a group) and downloading data of the electronic device stored in the cloud server) and/or to access data stored in a predetermined electronic device, a user of the electronic device needs to directly input, via the electronic device, identification information of a user of an external electronic device, or the user of the electronic device needs to capture a predetermined quick response code (QR code), so as to produce a group (i.e., inviting the user of the external electronic device), which is a generally used scheme. However, the group produced in this manner is a group manually produced by the user of the electronic device. The relationship between the electronic device that belongs to the produced group (e.g., the electronic device that invites an external electronic device) and at least one external electronic device (an electronic device that is invited) may not be taken into consideration, and thus only a static group function may be provided. For example, a second user of an external electronic device invited by a first user of the electronic device may be a user of which contact information is stored in a contact list (e.g., a contact information application) of the electronic device of the first user, and who frequently contacts with the first user. In this instance, according to the scheme that manually produces a group, although the second user invited to a group is a user who frequently contacts the first user and of which contact information is stored in the contact list of the first user, the second user is incapable of accessing an application installed in the electronic device of the first user, and only a predetermined static group function may be provided. That is, according to the scheme of manually producing a group, only a group function that does not take into consideration the relationship between the first user and the second user included in the group may be provided.

According to an embodiment of the disclosure, in case of production of a group, a group may be automatically produced in consideration of context information of an electronic device and/or the relationship between a first user of the electronic device and a second user of at least one external electronic device, and thus there is provided an electronic device that may provide a personalized group service (e.g., a data access service, a data sharing service, and/or a service for accessing a sub-electronic device subordinate to the electronic device).

According to an embodiment of the disclosure, each of a plurality of produced groups may be configured to provide a group service based on context information of an electronic device and/or the relationship between a first user of the electronic device and a second user of at least one external electronic device, and thus there is provided an electronic device that may provide a personalized group service to a user of the electronic device.

According to an embodiment of the disclosure, in case of production of a group, a group may be automatically produced in consideration of context information of an electronic device and/or the relationship between a first user of the electronic device and a second user of at least one external electronic device, and thus there is provided a control method of an electronic device that may provide a personalized group service (e.g., a data access service, a data sharing service, and/or a service for accessing a sub-electronic device subordinate to the electronic device).

According to an embodiment of the disclosure, each of a plurality of produced groups may be configured to provide a group service based on context information of an electronic device and/or the relationship between a first user of the electronic device and a second user of at least one external electronic device, and thus there is provided a control method of an electronic device that may provide a personalized group service to a user of the electronic device.

SUMMARY

An electronic device according to an embodiment of the disclosure may include a touch screen display, communication circuitry, and at least one processor, and the at least one processor may be configured to detect, via the communication circuitry, at least one external electronic device located around the electronic device, to receive a request for producing a group including the electronic device and the at least one external electronic device, to determine whether the number of times communication is performed between the at least one external electronic device and the electronic device is greater than or equal to a predetermined number of times, in response to reception of the request, to determine an attribute of the group to which the at least one external electronic device belongs based at least on a determination result and to display an indicator indicating the at least one detected external electronic device on the touch screen display according to the determined attribute.

A method of controlling an electronic device according to an embodiment of the disclosure may include an operation of detecting at least one external electronic device located around the electronic device, an operation of receiving a request for producing a group including the at least one external electronic device and the electronic device, an operation of determining whether the number of times communication is performed between the at least one detected external electronic device and the electronic device is greater than or equal to a predetermined number of times, in response to reception of the request, an operation of determining an attribute of the group to which the at least one external electronic device belongs based at least on a determination result, and an operation of displaying an indicator indicating the at least one detected external electronic device on a touch screen display of the electronic device according to the determined attribute.

According to an embodiment of the disclosure, in case of production of a group, a group may be automatically produced in consideration of context information of an electronic device and/or the relationship between a first user of the electronic device and a second user of at least one external electronic device, and thus there may be provided a personalized group service (e.g., a data access service, a data sharing service, and/or a service for accessing a sub-electronic device subordinate to the electronic device).

According to an embodiment of the disclosure, each of a plurality of produced groups may be configured to provide a group service based on context information of an electronic device and/or the relationship between a first user of the electronic device and a second user of at least one external electronic device, and thus there may be provided a personalized group service to a user of the electronic device.

The effect of various embodiments is not limited to the above-described effects, and it is apparent to those skilled in the art that various effects are immanent in the disclosure.

BRIEF DESCRIPTION OF DRAWINGS

FIG. 10 is a graphical diagram illustrating configurations of a first type of group, a second type of group, a third type of group, and a fourth type of group according to an embodiment of the disclosure.

DETAILED DESCRIPTION

Figure 1:
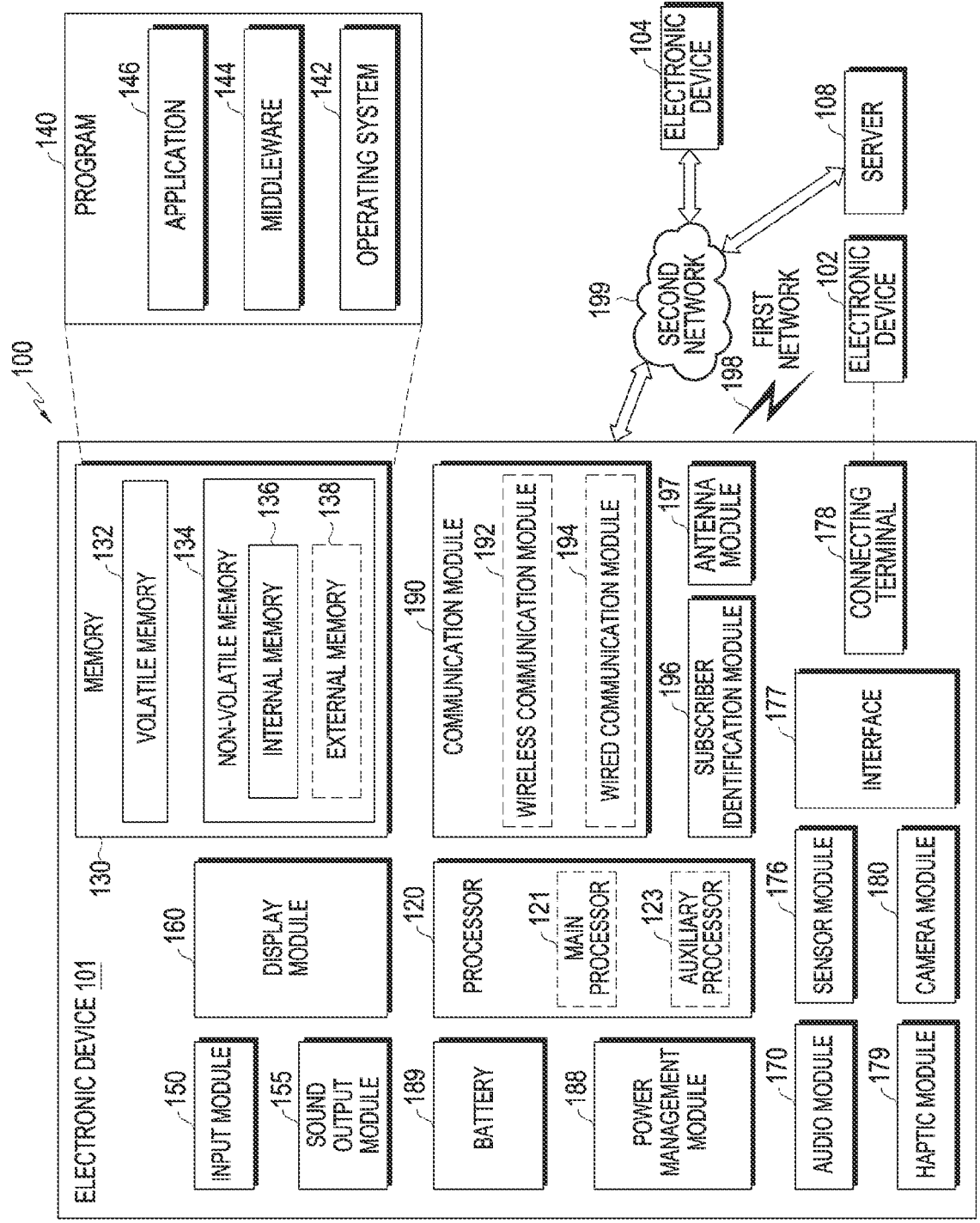
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
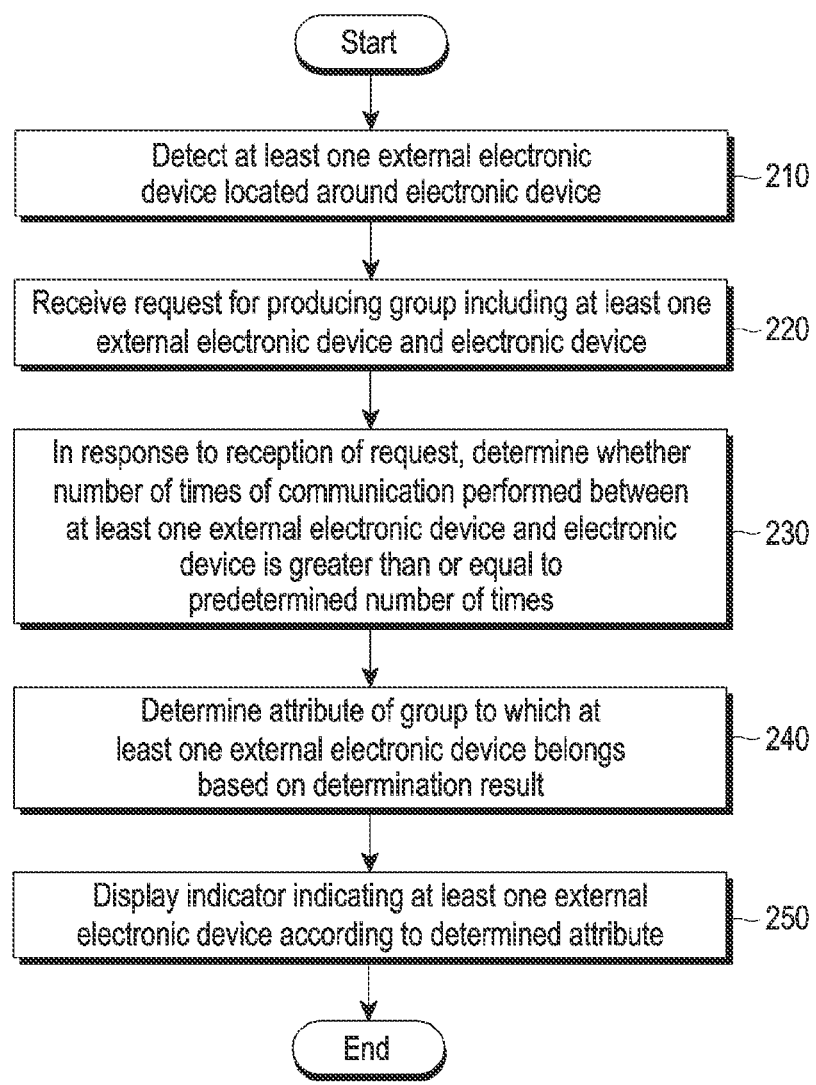
FIG. 2A is a flow diagram illustrating a function or an operation of determining the attribute of a group according to an embodiment of the disclosure.
Figure 2B:
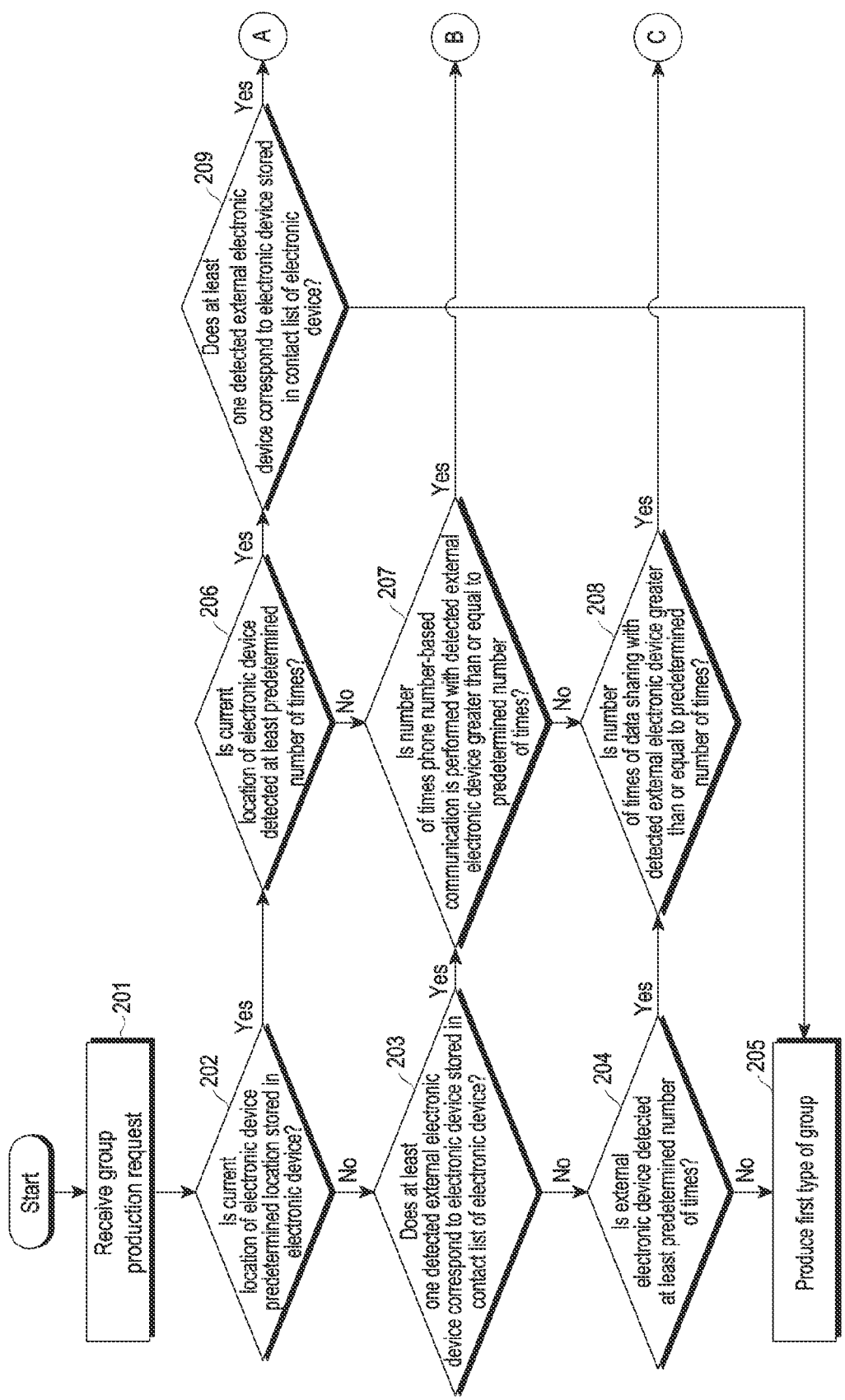
FIGS. 2B and 2C are flow diagrams illustrating a function or an operation of determining a first type of group, a second type of group, a third type of group, and a fourth type of group, according to an embodiment of the disclosure.
Figure 3A:
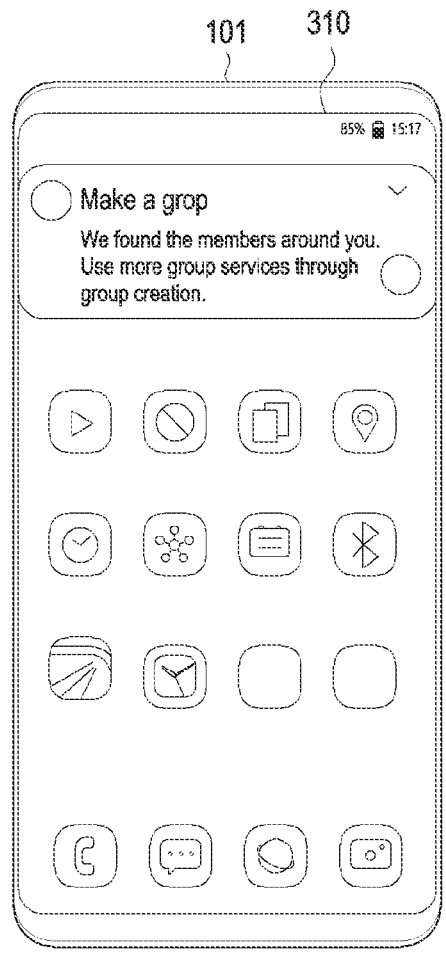
FIGS. 3A, 3B, and 3C are diagrams illustrating the content illustrated in FIG. 2A from the perspective of the experience of a user.
Figure 3B:
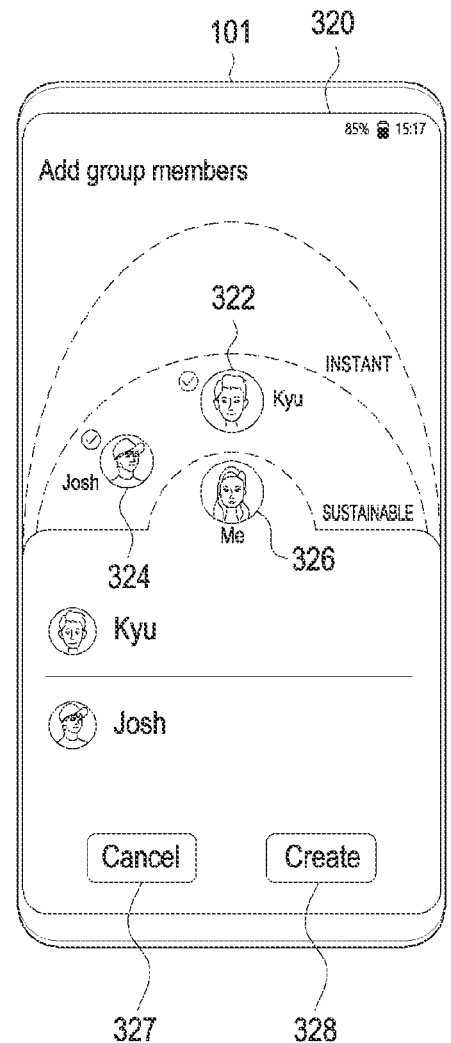
Figure 3C:
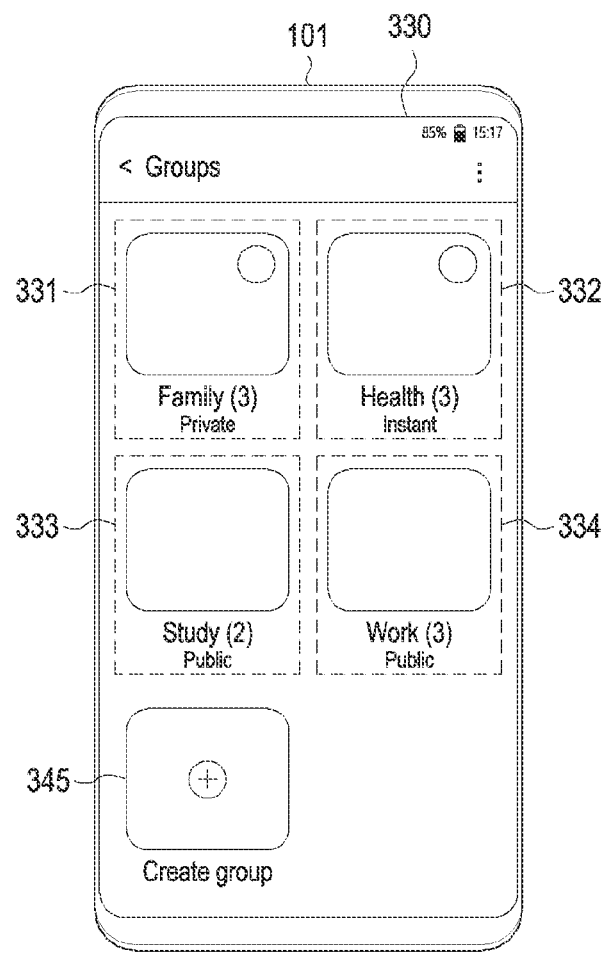

FIG. 2A is a flow diagram illustrating a function or an operation of determining the attribute of a group according to an embodiment of the disclosure. FIG. 2B is a diagram illustrating a function or an operation of determining a first type of group, a second type of group, a third type of group, and a fourth type of group according to an embodiment of the disclosure. FIGS. 3A to 3C are diagrams illustrating the content illustrated in FIG. 2A from the perspective of the experience of a user.

Referring to FIG. 2A and to FIGS. 3A to 3C, the electronic device 101 according to an embodiment of the disclosure may detect at least one external electronic device located around the electronic device 101 in operation 210. The electronic device 101 according to an embodiment of the disclosure may detect at least one external electronic device located around the electronic device 101 by using various short-distance communication schemes (e.g., Bluetooth low energy (BLE) and/or ultra wide band (UWB) communication scheme). In the disclosure, the term, "detection" may refer to a function or an operation of setting up a wireless communication channel with at least one external electronic device, and receiving identification information (e.g., an MAC address, a phone number of an external electronic device, a unique identification number (e.g., IMEI) of an external electronic device, and/or a model number (e.g., SM-G980F) of an external electronic device). The electronic device 101 according to an embodiment of the disclosure may periodically perform operation 210 at predetermined time intervals, or may perform in response to a request from a user of the electronic device 101.

The electronic device 101 according to an embodiment of the disclosure may receive a request for producing a group including at least one external electronic device and an electronic device in operation 220. In case at least one external electronic device is detected, the electronic device 101 according to an embodiment of the disclosure may display a notification 310 indicating that at least one external electronic device capable of being grouped is detected from around the electronic device 101, as illustrated in FIG. 3A. In case input of selecting the notification 310 is received, the electronic device 101 according to an embodiment of the disclosure may determine the attribute of a group to which the at least one detected external electronic device belongs.

In operation 230, in response to reception of the request in operation 220, the electronic device 101 according to an embodiment of the disclosure may determine whether the number of times of phone number-based communication between the electronic device 101 and at least one external electronic device (e.g., the number of times of receiving/making a call (e.g., a voice call, video call), the number of times of receiving/sending a text message (SMS), and/or the number of times of receiving/sending an SNS message) is greater than or equal to a predetermined number of times. The electronic device 101 according to an embodiment of the disclosure may perform operation 230 by determining whether the number of times communication for each of a plurality of types of communication (e.g., a phone call, a text message (SMS), an SNS message) is performed is greater than or equal to a predetermined number of times, or by summing the number of times communication of the plurality of types of communication is performed and determining whether the sum is greater than or equal to a predetermined number of times.

In operation 240, the electronic device 101 according to an embodiment of the disclosure may determine, based at least on a determination result of operation 230, the attribute of the group to which at least one external electronic device belongs. In case that the number of times communication is performed between at least one external electronic device and the electronic device 101 is greater than or equal to a predetermined number of times, the electronic device 101 according to an embodiment of the disclosure may determine the type of the group to which the at least one external electronic device belongs as a third type of group (e.g., a sustainable group capable of sharing only public data) or a fourth type of group (e.g., a sustainable group capable of sharing public data and privacy data). In case the number of times communication is performed between at least one external electronic device and the electronic device 101 is less than the predetermined number of times, the electronic device 101 according to an embodiment of the disclosure may determine the type of a group to which the at least one external electronic device belongs as a first type of group (e.g., an instant group capable of sharing only public data) or a second type of group (e.g., an instant group capable of sharing public data and privacy data).

The electronic device 101 according to an embodiment of the disclosure may display an indicator indicating at least one external electronic device according to the determined attribute in operation 250.

FIG. 2A illustrates an embodiment that distinguishes, as a sustainable group and an instant group, the attribute of a group to which at least one external electronic device belongs according to the number of times communication is performed between the at least one external electronic device and the electronic device 101. However, FIG. 2B illustrates a function or an operation of producing a first type of group, a second type of group, a third type of group, and a fourth type of group by the electronic device 101 according to an embodiment of the disclosure. Referring to FIG. 2B, the electronic device 101 according to an embodiment of the disclosure may receive a group production request in operation 201. As described above, the group production request according to an embodiment of the disclosure may include input of selecting the notification 310. The electronic device 101 according to an embodiment of the disclosure may determine whether the current location of the electronic device 101 is a predetermined location stored in the electronic device 101 in operation 202. The predetermined location according to an embodiment of the disclosure may be, for example, a home, an office, a school, and/or other places. Based on the current location information of the electronic device 101 and/or a period of time (e.g., from 7 AM to 6 PM) during which the electronic device 101 stays in a predetermined place, the electronic device 101 according to an embodiment of the disclosure may determine a current location, that is, may determine whether the current location is a home, an office, or a school. In case the current location of the electronic device 101 is not a predetermined location stored in the electronic device 101, the electronic device 101 according to an embodiment of the disclosure may determine whether at least one detected external electronic device is an electronic device stored in a contact list of the electronic device 101 in operation 203. The electronic device 101 according to an embodiment of the disclosure may determine whether the at least one detected external electronic device is an electronic device stored in the contact list of the electronic device 101, by using, for example, identification information (e.g., a phone number) received from the at least one external electronic device 101. Alternatively, whether the at least one detected external electronic device is an electronic device stored in the contact list of the electronic device 101 may be determined by determining whether a phone number corresponding to identification information received from at least one external electronic device is stored in the electronic device 101 by using the identification information (e.g., a MAC address or an IMEI) received from the at least one external electronic device. In case the external electronic device is an electronic device that is not stored in the contact list of the electronic device 101, the electronic device 101 according to an embodiment of the disclosure may determine whether the external electronic device is an electronic device that is detected at least a predetermined number of times in operation 204. The electronic device 101 according to an embodiment of the disclosure may determine whether an external electronic device is an electronic device that is detected at least a predetermined number of times by using the number of times that identification information transmitted from the external electronic device is detected. In case the external electronic device is a device that is detected less than the predetermined number of times, the electronic device 101 according to an embodiment of the disclosure may configure a group to which the at least one detected external electronic device belongs as a first type of group, and may produce the first type of group in operation 205. The first type of group according to an embodiment of the disclosure may be a group having an attribute that shares data in a group (e.g., a group chat room) during a first period of time (e.g., 24 hours) and allows at least one external electronic device or the electronic device to access only data designated as public data. To access data designated as public data, an external electronic device according to an embodiment of the disclosure may access a cloud server via a data sharing menu, a predetermined application (e.g., a Samsung® account application, a Samsung® cloud application), or a link (e.g., a URL address) provided by the electronic device 101, thereby accessing data stored in the electronic device 101. In the cloud server according to an embodiment of the disclosure, data uploaded by an electronic device and an external electronic device may be stored. Alternatively, via short-distance communication, the electronic device 101 may directly access an external electronic device, thereby accessing data stored in the external electronic device. According to an embodiment of the disclosure, whether data is public data may be designated in advance or may be designated by a user of the electronic device (e.g., the electronic device 101).

In case the current location of the electronic device 101 is a predetermined location stored in the electronic device 101, the electronic device 101 according to an embodiment of the disclosure may determine whether the current location of the electronic device 101 is a location detected at least a predetermined number of times (i.e., whether the current location is a location that the user of the electronic device 101 frequently visits) in operation 206. In case the current location of the electronic device 101 is a location detected less than the predetermined number of times, the electronic device 101 according to an embodiment of the disclosure may determine whether the number of times of phone number-based communication with a detected external electronic device (e.g., the number of times of receiving/making a call (e.g., a voice call, a video call), the number of times of receiving/sending a text message (SMS), and/or the number of times of receiving/sending an SNS message) is greater than or equal to a predetermined number of times in operation 207. The electronic device 101 according to an embodiment of the disclosure may perform operation 207 by determining whether the number of times of communication for each of a plurality of types of communication (e.g., a phone call, a text message (SMS), an SNS message) is greater than or equal to a predetermined number of times, or by summing the number of times of communication of the plurality of types of communication and determining whether the sum is greater than or equal to a predetermined number of times. In case the number of times of phone number-based communication with a detected external electronic device is less than the designated number of times, the electronic device 101 according to an embodiment of the disclosure may determine whether the number of times of sharing data with the detected external electronic device (e.g., file transmission or reception, streaming data transmission or reception) is greater than or equal to a predetermined number of times in operation 208. The electronic device 101 according to an embodiment of the disclosure may determine which electronic device shares data, by using identification information (e.g., MAC address) transmitted from a detected external electronic device, and, based thereon, may determine whether the number of times of data sharing with the detected external electronic device is greater than or equal to a predetermined number of times. In case the number of times of data sharing is less than the predetermined number of times, the electronic device 101 according to an embodiment of the disclosure may determine, as a first type of group, a group to which the detected external electronic device belongs. In case the number of times of data sharing is greater than or equal to the predetermined number of times, the electronic device 101 according to an embodiment of the disclosure may determine, as a second type of group, a group to which the detected external electronic device belongs in operation 212. The second type of group according to an embodiment of the disclosure may be a group having an attribute that shares data in a group (e.g., a group chat room) during a first period of time (e.g., 24 hours) and allows at least one external electronic device or the electronic device 101 to access data designated as public data and privacy data. According to an embodiment of the disclosure, whether data is privacy data may be designated in advance or may be designated by a user of the electronic device (e.g., the electronic device 101).

In case the current location of the electronic device 101 is a location detected at least a predetermined number of times in operation 206, the electronic device 101 according to an embodiment of the disclosure may determine whether at least one detected external electronic device is an electronic device stored in a contact list of the electronic device 101 in operation 209. The electronic device 101 according to an embodiment of the disclosure may determine whether the at least one detected external electronic device is an electronic device stored in the contact list of the electronic device 101, by using, for example, identification information (e.g., a phone number) received from the at least one external electronic device 101. Alternatively, whether the at least one detected external electronic device is an electronic device stored in the contact list of the electronic device 101 may be determined by determining whether a phone number corresponding to identification information received from at least one external electronic device is stored in the electronic device 101, by using the identification information (e.g., a MAC address or an IMEI) received from the at least one external electronic device. In case the at least one detected external electronic device is not an electronic device stored in the contact list of the electronic device 101 in operation 209, the electronic device 101 according to an embodiment of the disclosure may determine, as the first type of group, a group to which the external electronic device belongs. In case the at least one detected external electronic device is an electronic device that is stored in the contact list of the electronic device 101, the electronic device 101 according to an embodiment of the disclosure may determine whether the number of times of phone number-based communication with the detected external electronic device (e.g., the number of times of receiving/making a call (e.g., a voice call, a video call), the number of times of receiving/sending a text message (SMS), and/or the number of times of receiving/sending an SNS message) is greater than or equal to a predetermined number of times on operation 211. The electronic device 101 according to an embodiment of the disclosure may perform operation 211 by determining whether the number of times of communication for each of a plurality of types of communication (e.g., a phone call, a text message (SMS), an SNS message) is greater than or equal to a predetermined number of times, or by summing the number of times of communication of the plurality of types of communication and determining whether the sum is greater than or equal to a predetermined number of times. In case the number of times of phone number-based communication with the detected external electronic device is less than the predetermined number of times, the electronic device 101 according to an embodiment may determine, as a second type of group, the group to which the detected external electronic device belongs in operation 212. In case the number of times of phone number-based communication with the detected external electronic device is greater than or equal to the predetermined number of times, the electronic device 101 according to an embodiment may determine whether the external electronic device is an electronic device detected at least a predetermined number of times in operation 213. The electronic device 101 according to an embodiment of the disclosure may determine whether an external electronic device is an electronic device that is detected at least a predetermined number of times by using the number of times that identification information transmitted from the external electronic device is detected. In case the external electronic device is a device detected less than the predetermined number of times, the electronic device 101 according to an embodiment of the disclosure may determine a group to which at least one external electronic device belongs as a third type of group, and may produce the third type of group in operation 215. The third type of group according to an embodiment of the disclosure may be a group having an attribute that shares data with the at least one external electronic device during a second period of time (e.g., 6 months), and allows at least one external electronic device or the electronic device 101 to access only data designated as public data.

In case the external electronic device is a device detected at least the predetermined number of times, the electronic device 101 according to an embodiment of the disclosure may determine whether the number of times of sharing data with the detected external electronic device (e.g., file transmission or reception, streaming data transmission or reception) is greater than or equal to a predetermined number of times in operation 214. The electronic device 101 according to an embodiment of the disclosure may determine which electronic device shares data, by using identification information (e.g., a MAC address) transmitted from a detected external electronic device, and, based thereon, may determine whether the number of times of data sharing performed with the detected external electronic device is greater than or equal to the predetermined number of times. In case the number of times of data sharing is less than the predetermined number of times, the electronic device 101 according to an embodiment of the disclosure may determine, as a third type of group, a group to which the detected external electronic device belongs. In case the number of times of data sharing (e.g., file transmission or transmission, streaming data transmission or reception) with the detected external electronic device is greater than or equal to a predetermined number of times, the electronic device 101 according to an embodiment of the disclosure may determine a group to which at least one detected external electronic device belongs as a fourth type of group, and may produce the fourth type of group in operation 216. The fourth type of group according to an embodiment of the disclosure may be a group having an attribute that shares data with the at least one external electronic device during a second period of time (e.g., 6 months), and allows at least one external electronic device or the electronic device 101 to access data designated as public data and privacy data.

The electronic device 101 according to an embodiment of the disclosure may display an indicator indicating at least one external electronic device according to the determined attribute of a group. Referring to FIG. 3B, the electronic device 101 according to an embodiment of the disclosure may display a first screen 320 to produce a group. In the first screen 320 according to an embodiment of the disclosure, a first indicator 326 indicating the electronic device that searches for an external electronic device, an indicator (e.g., a second indicator 322, a third indicator 324) indicating a detected external electronic device, a first button 327 for cancelling production of a group, and a second button 328 for producing a group may be displayed. In case the at least one detected external electronic device is determined as belonging to the third type of group or the fourth type of group, the electronic device 101 according to an embodiment of the disclosure may display the second indicator 322 and the third indicator 324 in the same area (e.g., a sustainable group area) as illustrated in FIG. 3B. The electronic device 101 according to an embodiment of the disclosure may receive, from a user, input of selecting an indicator (e.g., the second indicator 322 and the third indicator 324). The electronic device 101 according to an embodiment of the disclosure may produce a group so that the group includes only an external electronic device corresponding to an indicator (e.g., the second indicator 322 and the third indicator 324) selected by the user. In case input of selecting the second button 328 is received, the electronic device 101 according to an embodiment of the disclosure may display a second screen 330 as illustrated in FIG. 3C. In the second screen 330 according to an embodiment of the disclosure, graphic elements (e.g., a first graphic element 331 indicating a first group, a second graphic element 332 indicating a second group, and a third graphic element 333 indicating a third group) associated with a previously configured group, a fourth graphic element 334 indicating a newly produced group, and a fifth graphic element 345 for producing a group may be displayed. In a graphic element (e.g., the first graphic element 331) according to an embodiment of the disclosure, at least one among the name of a group (e.g., family), the number of members included in a group (e.g., 3), and the attribute of a group (e.g., "private") may be displayed. For example, in case the attribute of the group is displayed as "private", it may indicate that users in the group are capable of accessing and/or sharing data designated as privacy data, as well as data designated as public data. For example, in case the attribute of the group is displayed as "public", it may indicate that users in the group are capable of accessing and/or sharing only data designated as public data. For example, in case the attribute of the group is displayed as "instant", it may indicate that the corresponding group has an attribute of a first type of group or a second type of group.

Figure 4:
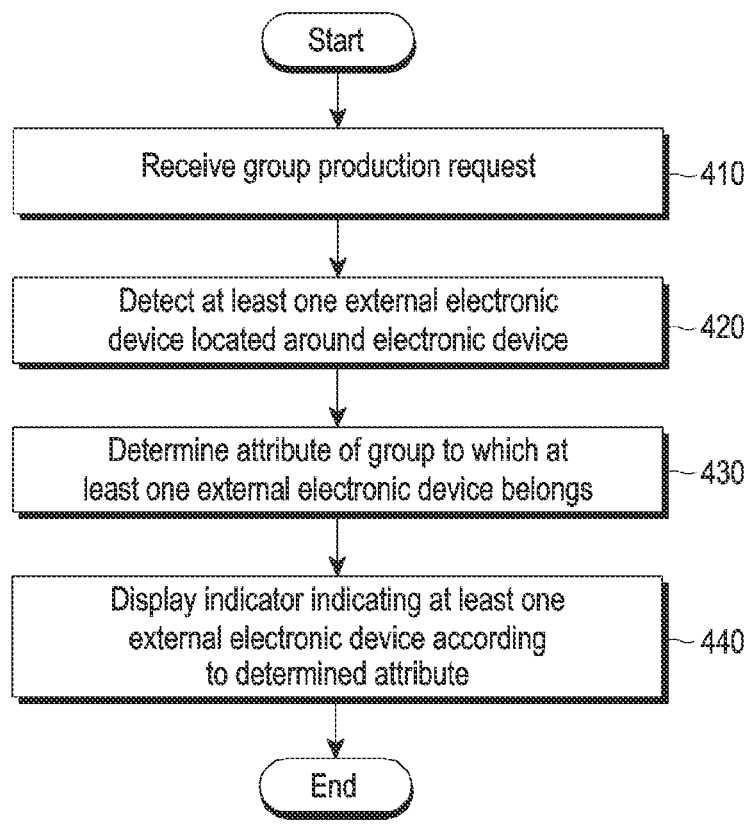
FIG. 4 is a flow diagram illustrating a function or an operation of producing a group according to an embodiment of the disclosure.

FIG. 4 is a flow diagram illustrating a function or an operation of producing a group according to an embodiment of the disclosure. FIGS. 5A to 5F are diagrams illustrating the content illustrated in FIG. 4 from the perspective of the experience of a user.

Figure 5A:
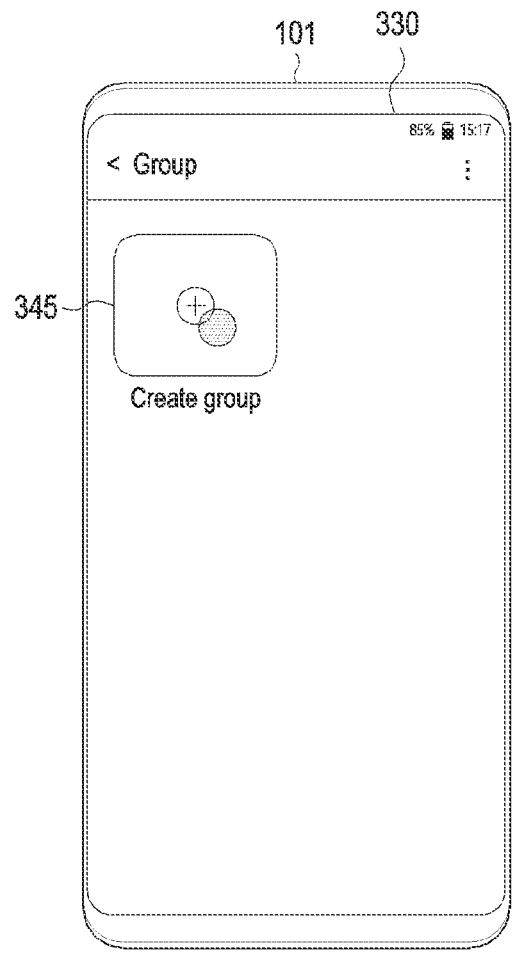
FIGS. 5A, 5B, 5C, 5D, 5E, and 5F are diagrams illustrating the content illustrated in FIG. 4 from the perspective of the experience of a user.
Figure 5B:
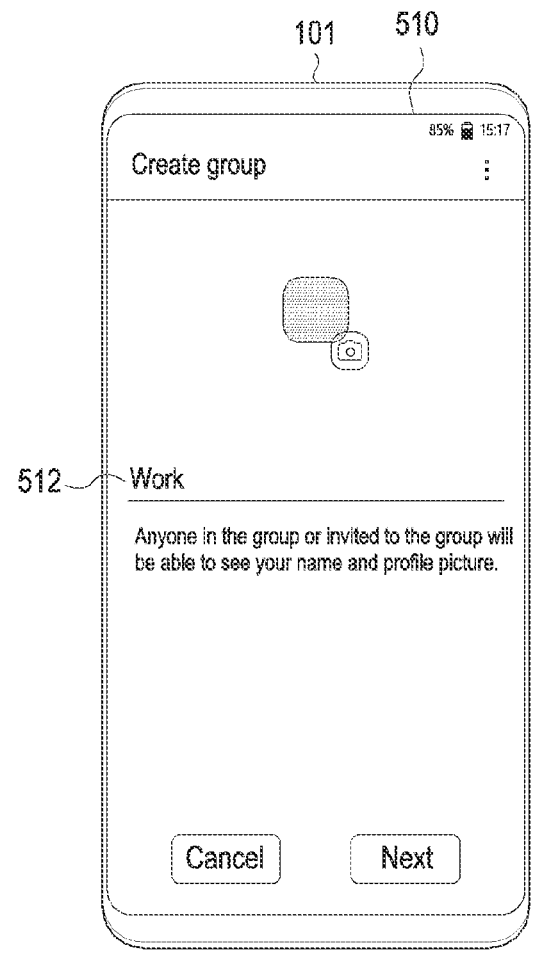

Referring to FIG. 4, the electronic device 101 according to an embodiment of the disclosure may receive a group production request in operation 410. The electronic device 101 according to an embodiment of the disclosure, as illustrated in FIG. 5A, may receive a user input (e.g., a touch input) to the fifth graphic element 345 for producing a group. In case a user input (e.g., a touch input) to the fifth graphic element 345 for producing a group is received, the electronic device 101 according to an embodiment of the disclosure may display a third screen 510 for producing a group as illustrated in FIG. 5B. A name 512 of a group may be displayed in the third screen 510 according to an embodiment of the disclosure. As the name 512 of the group according to an embodiment of the disclosure, the name of a place corresponding to the current location of the electronic device 101 or the name of a predetermined place may be displayed as the name of the group. To this end, the electronic device 101 according to an embodiment of the disclosure may perform a function or an operation of obtaining information associated with the current location.

The electronic device 101 according to an embodiment of the disclosure may detect at least one external electronic device located around the electronic device 101 in operation 420. In case a user input (e.g., a touch input) to the fifth graphic element 345 for producing a group is received from a user, the electronic device 101 according to an embodiment of the disclosure may perform a function or an operation of detecting an external electronic device located around the electronic device 101. Alternatively, according to an embodiment of the disclosure, in case the group production request (e.g., input of selecting a "Next" button) is received after input of the name 512 of the group is received from a user, a function or an operation of detecting an external electronic device located around the electronic device 101 may be performed. Alternatively, before a user input (e.g., a touch input) to the fifth graphic element 345 for producing a group is received from a user, the electronic device 101 according to an embodiment of the disclosure may detect an external electronic device located around the electronic device 101.

Figure 2C:
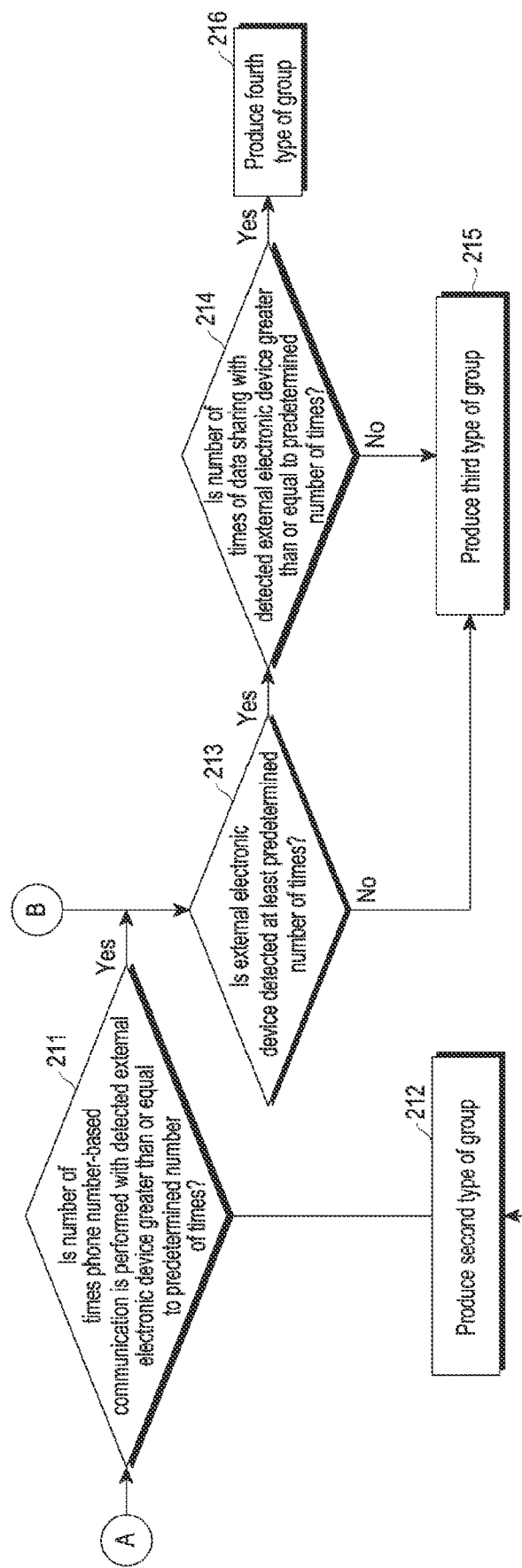

In operation 430, the electronic device 430 according to an embodiment of the disclosure may determine the attribute of the group to which at least one external electronic device belongs. The content described with reference to FIGS. 2B and 2C may be equally applied to operation 430 according to an embodiment of the disclosure.

Figure 5C:
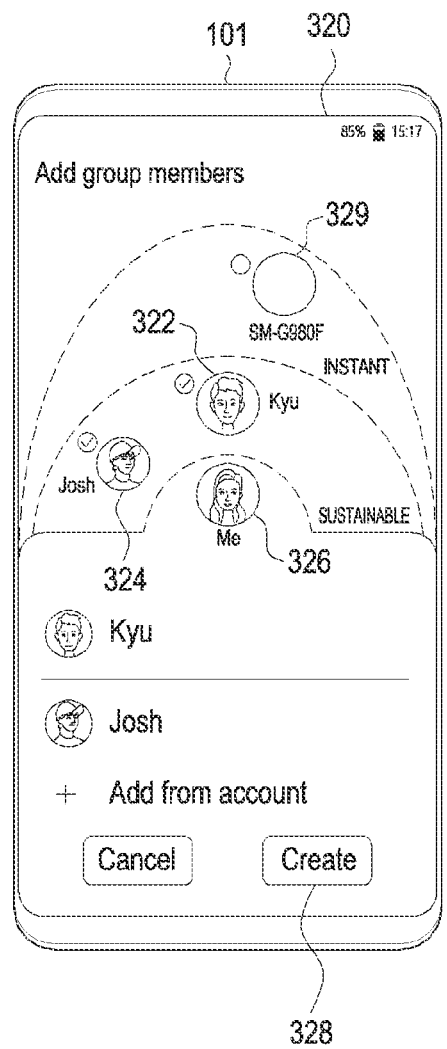
Figure 5D:
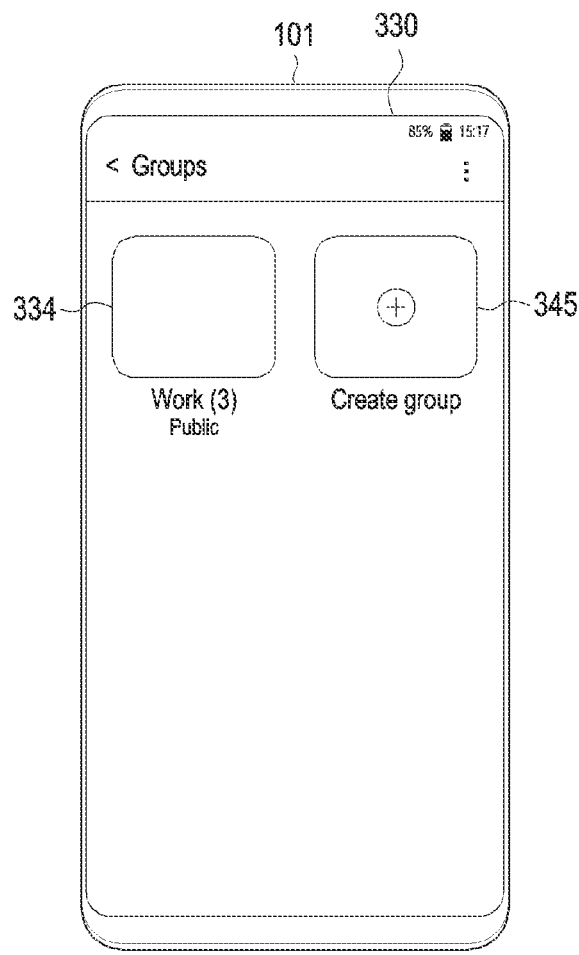
Figure 5E:
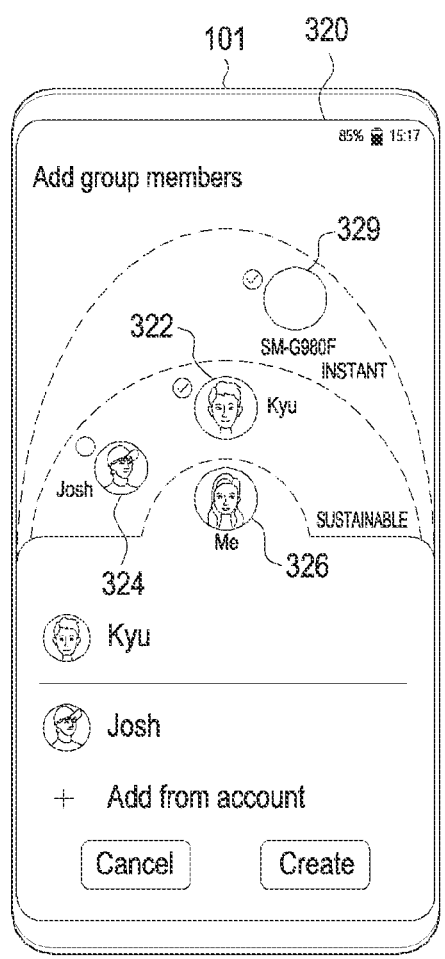
Figure 5F:
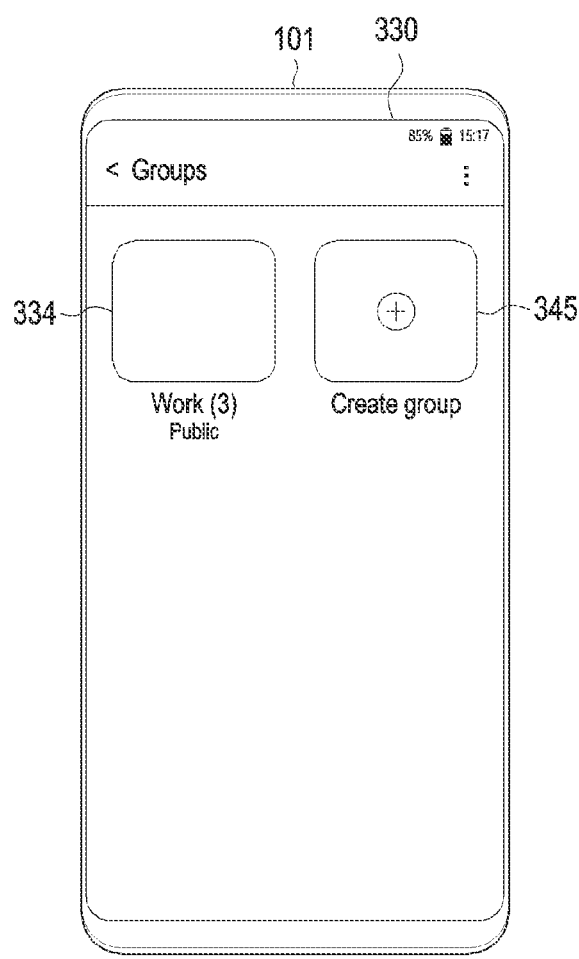

The electronic device 430 according to an embodiment of the disclosure may display an indicator indicating at least one external electronic device according to the determined attribute in operation 440. Referring to FIG. 5C, the electronic device 101 according to an embodiment of the disclosure may display a first screen 320 to produce a group. In the first screen 320 according to an embodiment of the disclosure, a first indicator 326 indicating the electronic device 101 that searches for an external electronic device, an indicator (e.g., the second indicator 322, the third indicator 324, and a fourth indicator 329) indicating a detected external electronic device, and a second button 328 for producing a group may be displayed. In case the at least one detected external electronic device is determined as belonging to a third type of group or a fourth type of group, the electronic device 101 according to an embodiment of the disclosure may display the second indicator 322 and the third indicator 324 in the same area (e.g., a sustainable group area) as illustrated in FIG. 5C. In addition, in case the at least one detected external electronic device is determined as belonging to a first type of group or a second type of group, the electronic device 101 according to an embodiment of the disclosure may display the fourth indicator 329 in an area (e.g., an instant group area) different from the area where the second indicator 322 and the third indicator 324 are displayed. The electronic device 101 according to an embodiment of the disclosure may receive, from a user, input of selecting an indicator (e.g., the second indicator 322 and the third indicator 324). The electronic device 101 according to an embodiment of the disclosure may produce a group so that the group includes only an external electronic device corresponding to an indicator (e.g., the second indicator 322 and the third indicator 324) selected by the user. In case input of selecting the second button 328 is received, the electronic device 101 according to an embodiment of the disclosure may display a second screen 330 as illustrated in FIG. 5D. In the second screen 330 according to an embodiment of the disclosure, the fourth graphic element 334 for indicating a newly produced group and the fifth graphic element 345 for producing a group may be displayed. The electronic device 101 according to an embodiment of the disclosure may receive a user input (e.g., a touch input) for selecting an indicator (e.g., the second indicator 322 and the fourth indicator 327) included in a different type of group, as illustrated in FIG. 5E. In this instance, as illustrated in FIG. 5F, the electronic device 101 according to an embodiment of the disclosure may determine the attribute of a group as a type of a group (the first type of group or the second type of group) in which an external electronic device corresponding to the fourth indicator 329 is included.

Figure 6:
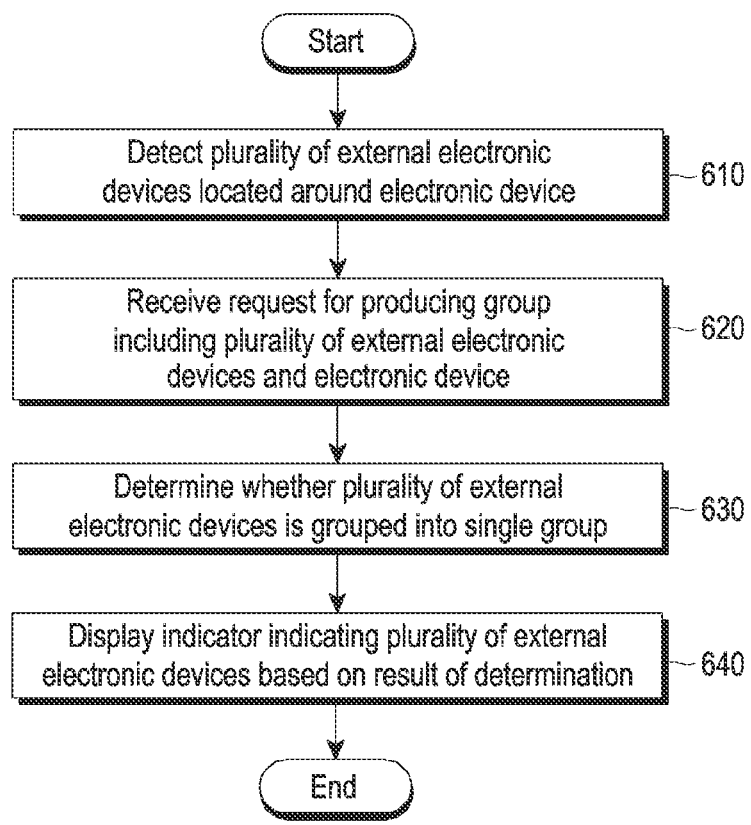
FIG. 6 is a flow diagram illustrating a function or an operation of joining a configured single group by an electronic device in case a plurality of external electronic devices is already grouped into a single group according to an embodiment of the disclosure.
Figures 7A, 7B:
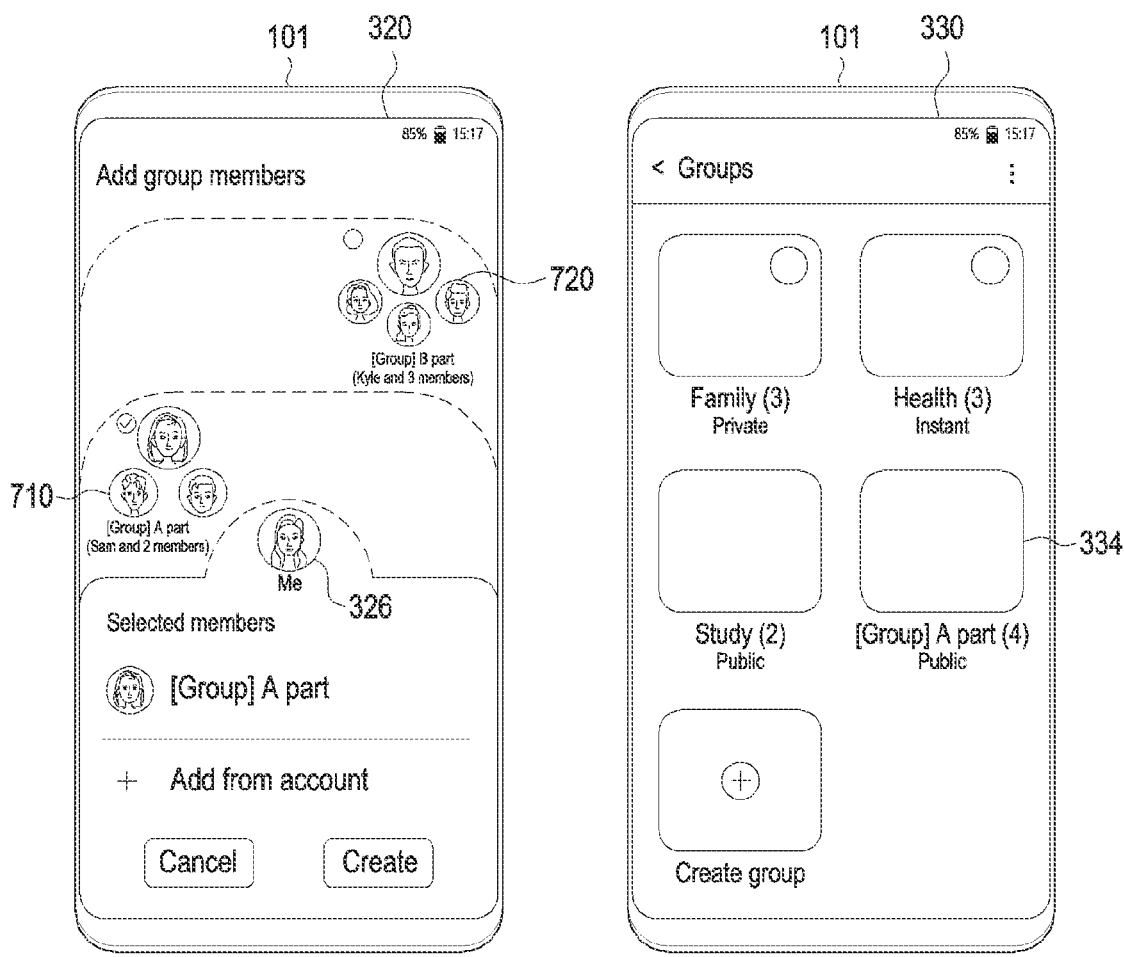
FIGS. 7A and 7B are diagrams illustrating the content illustrated in FIG. 6 from the perspective of the experience of a user.

FIG. 6 is a flow diagram illustrating a function or an operation of joining an already configured single group by the electronic device 101 in case a plurality of external electronic devices is already grouped into a single group according to an embodiment of the disclosure. FIGS. 7A and 7B are diagrams illustrating the content illustrated in FIG. 6 from the perspective of the experience of a user.

Referring to FIG. 6, the electronic device 101 according to an embodiment of the disclosure may detect a plurality of external electronic devices located around the electronic device 101 in operation 610. The electronic device 101 according to an embodiment of the disclosure may detect at least one external electronic device located around the electronic device 101 by using various short-distance communication schemes (e.g., Bluetooth low energy (BLE) and/or ultra wide band (UWB) communication scheme).

The electronic device 101 according to an embodiment of the disclosure may receive a request for producing a group including a plurality of external electronic devices and the electronic device 101 in operation 620. In case at least one external electronic device is detected, the electronic device 101 according to an embodiment of the disclosure may display the notification 310 indicating that at least one external electronic device capable of being grouped is detected from around the electronic device 101, as illustrated in FIG. 3A. In case input of selecting the notification 310 is received, the electronic device 101 according to an embodiment of the disclosure may determine the attribute of a group to which the plurality of detected external electronic devices belong, and may determine whether a plurality of external electronic devices are grouped into a single group.

In operation 630, the electronic device 101 according to an embodiment of the disclosure may determine whether a plurality of external electronic devices are grouped into a single group. The electronic device 101 according to an embodiment of the disclosure may obtain, from each of the plurality of external electronic devices, information indicating whether each of the plurality of external electronic devices is included in a predetermined group, and/or information indicating a group to which each of the plurality of external electronic devices belongs. Based on the obtained information as described above, the electronic device 101 according to an embodiment of the disclosure may determine whether a plurality of external electronic devices are grouped into a single group.

In operation 640, the electronic device 101 according to an embodiment of the disclosure may display, based a determination result of operation 630, an indicator indicating the plurality of external electronic devices in operation 640. Referring to FIG. 7A, the electronic device 101 according to an embodiment of the disclosure may group indicators indicating a plurality of external electronic devices included in a single predetermined group, and may display the same (e.g., a first group indicator 710 and a second group indicator 720). The electronic device 101 according to an embodiment of the disclosure may receive input of selecting at least one group indicator (e.g., the first group indicator 710), and may receive a group production request (e.g., receiving input of selecting a "Create" button), whereby the selected group may be invited as a whole, as illustrated in FIG. 7B. In other words, the electronic device 101 may join the selected group. FIG. 7B illustrates an embodiment that displays the fourth graphic element 334 indicating a newly produced group is displayed in the second screen 330.

Figure 8:
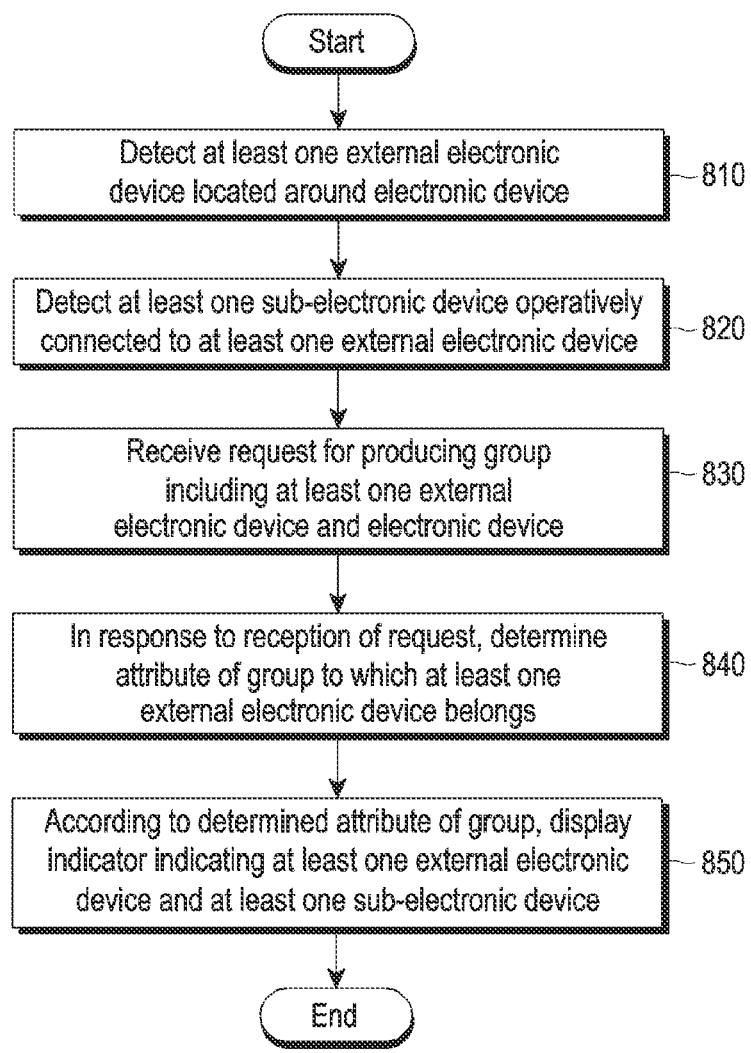
FIG. 8 is a flow diagram illustrating a function or an operation of producing a group so that a sub-electronic device operatively connected to an external electronic device is included according to an embodiment of the disclosure.
Figures 9A, 9B:
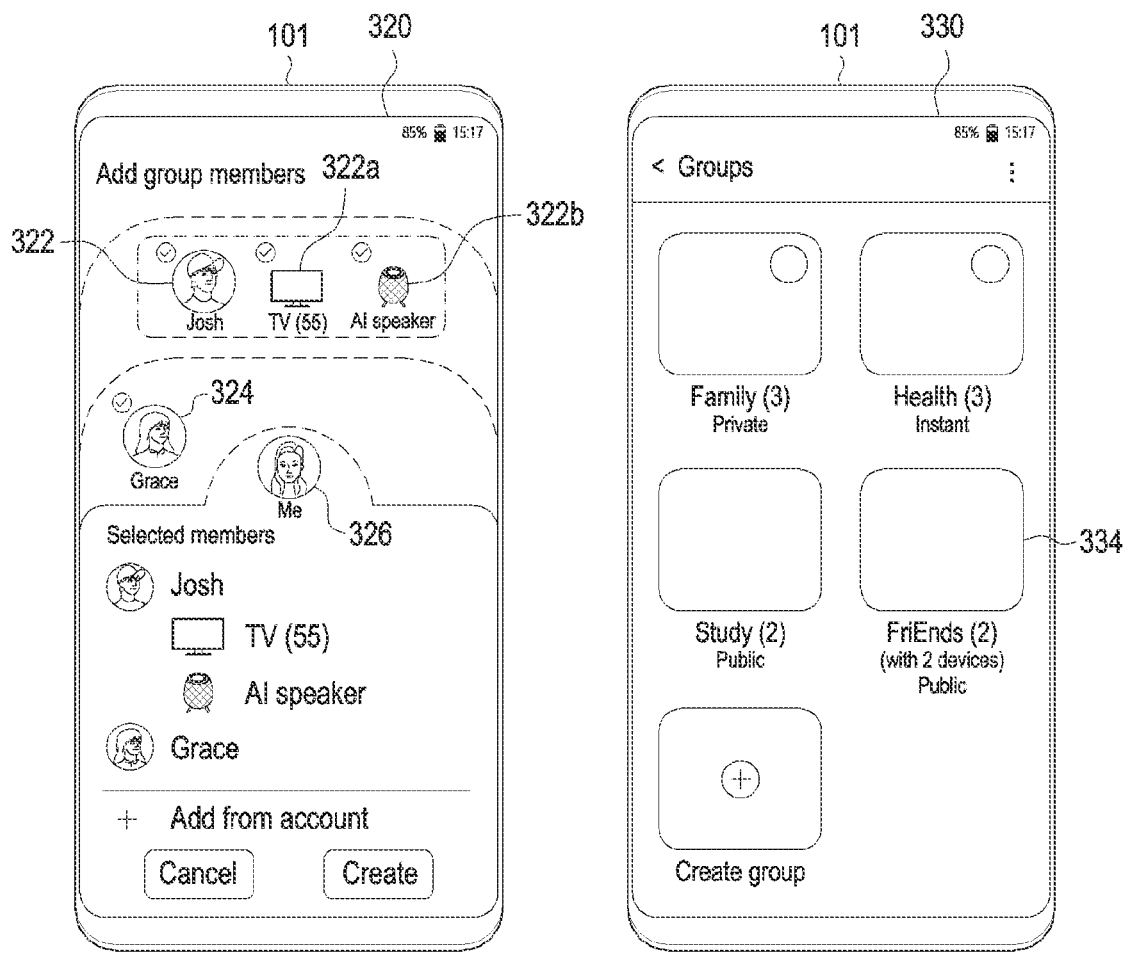
FIGS. 9A and 9B are diagrams illustrating the content illustrated in FIG. 8 from the perspective of the experience of a user.

FIG. 8 is a flow diagram illustrating a function or an operation of producing a group so that a sub-electronic device operatively connected to an external electronic device is included according to an embodiment of the disclosure. FIGS. 9A and 9B are diagrams illustrating the content illustrated in FIG. 8 from the perspective of the experience of a user.

Referring to FIG. 8, the electronic device 101 according to an embodiment of the disclosure may detect a plurality of external electronic devices located around the electronic device 101 in operation 810. The electronic device 101 according to an embodiment of the disclosure may detect at least one external electronic device located around the electronic device 101 by using various short-distance communication schemes (e.g., Bluetooth low energy (BLE) and/or ultra wide band (UWB) communication scheme).

In operation 820, the electronic device 101 according to an embodiment of the disclosure may detect at least one sub-electronic device operatively connected to at least one external electronic device. The electronic device 101 according to an embodiment of the disclosure may receive, from the detected external electronic device, a sub-electronic device (e.g., a TV, an AI speaker) operatively connected to the external electronic device. The electronic device 101 according to an embodiment of the disclosure may receive information associated with a sub-electronic device connected to the external electronic device via short-distance communication and/or information associated with a sub-electronic device registered via a predetermined account (e.g., a Samsung® account).

The electronic device 101 according to an embodiment of the disclosure may receive a request for producing a group including at least one external electronic device and the electronic device 101 in operation 830. In case at least one external electronic device is detected, the electronic device 101 according to an embodiment of the disclosure may display the notification 310 indicating that at least one external electronic device capable of being grouped is detected from around the electronic device 101, as illustrated in FIG. 3A. In case input of selecting the notification 310 is received, the electronic device 101 according to an embodiment of the disclosure may determine the attribute of a group to which the at least one detected external electronic device belongs.

In operation 840, the electronic device 101 according to an embodiment of the disclosure may determine, based at least on a determination result of operation 830, the attribute of the group to which the at least one external electronic device belongs. In case the number of times communication is performed between at least one external electronic device and the electronic device 101 is greater than or equal to a predetermined number of times, the electronic device 101 according to an embodiment of the disclosure may determine the type of a group to which the at least one external electronic device belongs as a third type of group (e.g., a sustainable group capable of sharing only public data) or a fourth type of group (e.g., a sustainable group capable of sharing public data and privacy data). In case the number of times communication is performed between at least one external electronic device and the electronic device 101 is less than the predetermined number of times, the electronic device 101 according to an embodiment of the disclosure may determine the type of a group to which the at least one external electronic device belongs as a first type of group (e.g., an instant group capable of sharing only public data) or a second type of group (e.g., an instant group capable of sharing public data and privacy data). Furthermore, the descriptions that have been provided with reference to FIGS. 2B and 2C may be equally applied to operation 840.

In operation 850, the electronic device 101 according to an embodiment of the disclosure may display, based on the determined attribute of a group, indicators indicating at least one external electronic device and at least one sub-electronic device according to the determined attribute of a group. Referring to FIG. 9A, based on a determined attribute of a group, the electronic device 101 according to an embodiment of the disclosure may display an indicator (e.g., a first sub-indicator 322a, a second sub-indicator 322b) indicating a sub-electronic device subordinate to a detected external electronic device, together with an indicator (e.g., the second indicator 322) indicating the detected external electronic device. FIG. 9A illustrates an embodiment in which an indicator (e.g., the second indicator 322) indicating the detected external electronic device and an indicator (e.g., the first sub-indicator 322a and the second sub-indicator 322b) indicating a sub-electronic device subordinate to the detected external electronic device belong to a first type of group or a second type of group. In case the electronic device 101 according to an embodiment of the disclosure receives input of selecting at least one indicator (e.g., the second indicator 322, the first sub-indicator 322a, and the second sub-indicator 322b) and receives a group production request (e.g., receiving input of selecting a "Create" button), the electronic device 101 may produce the selected external electronic device and the sub-electronic device as a single group. FIG. 9B illustrates an embodiment that displays the fourth graphic element 334 indicating a newly produced group is displayed in the second screen 330. According to an embodiment of the disclosure, the fourth graphic element 334 may include information (e.g., "with 2 devices") indicating that at least one sub-electronic device is included as a device included in a group. According to an embodiment of the disclosure, group members may access and control a sub-electronic device allowed by a group member (the owner of the sub-electronic device). According to an embodiment of the disclosure, a sub-electronic device allowed by a group member may be configured as a public device, and a sub-electronic device that a group member allows only part of the group members to use may be configured as a private device.

FIG. 10 is a graphical diagram illustrating configurations of a first type of group, a second type of group, a third type of group, and a fourth type of group according to an embodiment of the disclosure.

Referring to FIG. 10, a first type of group, a second type of group, a third type of group, and a fourth type of group according to an embodiment of the disclosure may be configured to have different values for a "group activation" item, an "accessible app" item, an "accessible data" item, a "data expiration date" item, a "device access" item, and a "privacy text" item, respectively. The "group activation" item according to an embodiment of the disclosure may be an item indicating whether to provide, via the electronic device 101 of FIG. 1, a group service function (e.g., a function of accessing predetermined data stored in an electronic device or an external electronic device by an external electronic device or the electronic device 101, or a function of sharing data stored in an electronic device or an external electronic device with an external electronic device or the electronic device 101). According to an embodiment of the disclosure, in case the "group activation" item is designated as "Auto", a group service function may or may not be provided via the electronic device 101 depending on the current situation of the electronic device 101 (e.g., the current location of the electronic device 101, the current time). For example, in case the electronic device 101 is located in a predetermined place (e.g., an office), a group service function may be provided via the electronic device 101. The "accessible app" item according to an embodiment of the disclosure may indicate the type of application that the electronic device 101 or an external electronic device is capable of accessing among applications installed in the external electronic device or the electronic device 101. The "accessible data" item according to an embodiment of the disclosure may indicate the type of data that the electronic device 101 or an external electronic device is capable of accessing among data stored in the external electronic device or the electronic device 101. The "data expiration date" item according to an embodiment of the disclosure may be a period of time during which data shared via a group service is maintained in a group (e.g., in a group chat room). The "device access" item according to an embodiment of the disclosure may be the right to access a sub-electronic device. The "privacy text" item of the disclosure may be the right to access (whether privacy text input in the group chat room is to be displayed) privacy text (e.g., a string including a predetermined keyword). According to an embodiment of the disclosure, various configurations illustrated in FIG. 10 may be applicable to all of the devices included in a group (e.g., the case in which an external electronic device accesses data stored in the electronic device 101 that produces a group and the case in which the electronic device 101 that produces a group access data stored in an external electronic device), or may be applicable only among some electronic devices (e.g., the case in which an external electronic device accesses data stored in the electronic device 101 that produces a group).

Figure 11A:
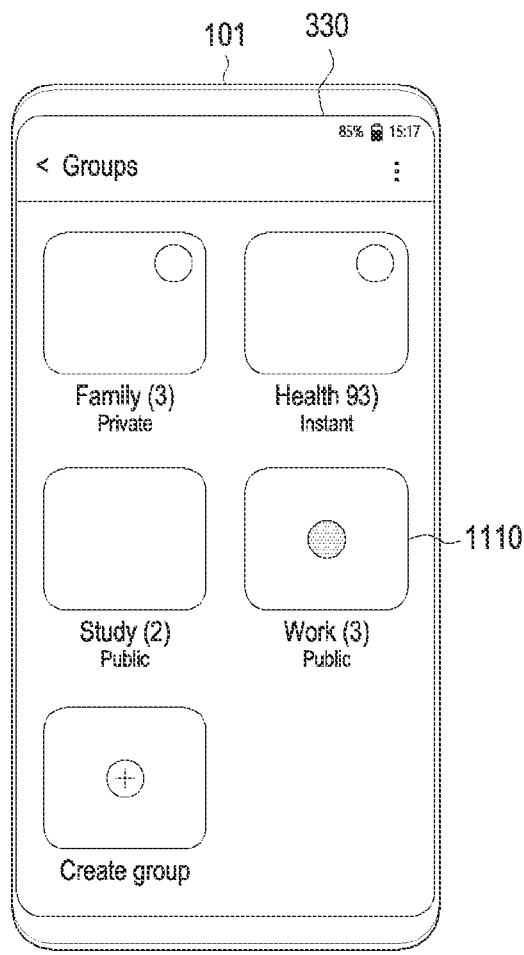
FIGS. 11A, 11B, and 11C are diagrams illustrating a setting screen for managing a group produced according to an embodiment of the disclosure from the perspective of the experience of a user.
Figure 11B:
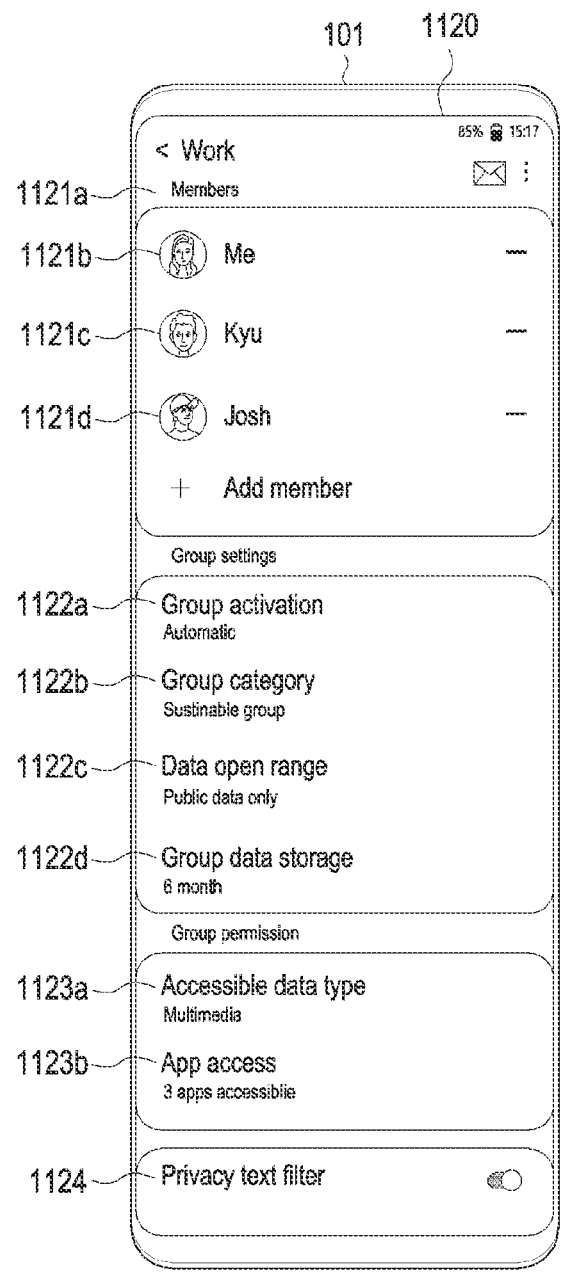
Figure 11C:
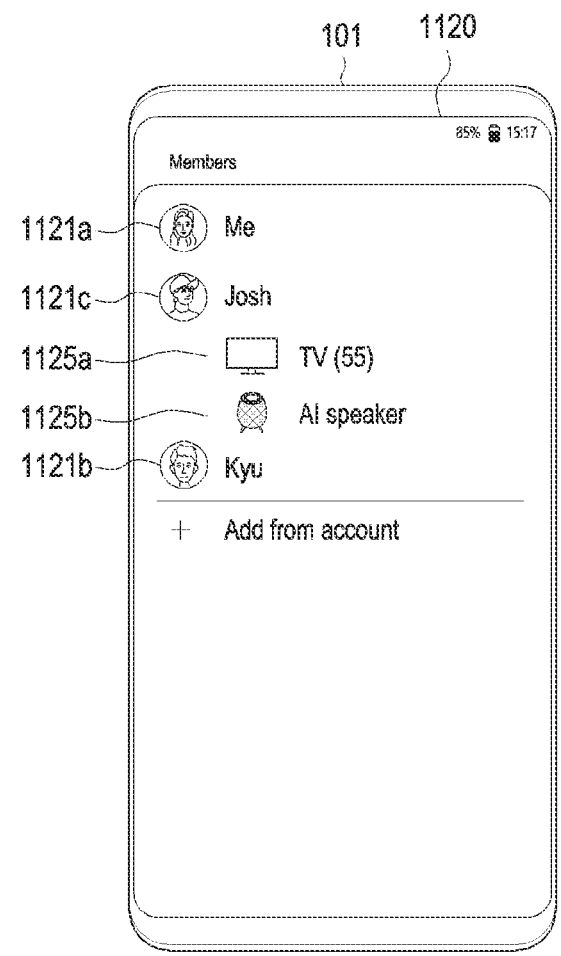

FIGS. 11A to 11C are diagrams illustrating a setting screen for managing a group produced according to an embodiment of the disclosure from the perspective of the experience of a user.

Referring to FIGS. 11A to 11C, the electronic device 101 according to an embodiment of the disclosure may display a second screen 330. The electronic device 101 according to an embodiment of the disclosure may receive input of selecting any one graphic element (e.g., a sixth graphic element 1110). The electronic device 101 according to an embodiment of the disclosure may display a setting screen 1120 as illustrated in FIG. 11B. In the setting screen 1120 according to an embodiment of the disclosure, a first user interface to perform chatting among devices included in a group may be displayed. In the setting screen 1120 according to an embodiment of the disclosure, information associated with group configuration devices (e.g., a first configuration device 1121a, a second configuration device 1121b, a third configuration device 1121c, and a fourth configuration device 1121d), and various items for a detailed group setting (e.g., a first item 1122a for setting group activation, a second item 1122b for changing the type of group, a third item 1122c for setting a data open range, a fourth item 1122d for setting a data storage cycle of data shared among group members, a fifth item 1123a for setting the right to access data, a sixth item 1123b for setting the right to access an application, and/or a seventh item 1124 for setting whether to display privacy text. As illustrated in FIG. 11C, in case a sub-electronic device is included as a group configuration device, the electronic device 101 according to an embodiment of the disclosure may display information (e.g., a first sub-configuration device 1125a and a second sub-configuration device 1125b).

FIGS. 12A to 12H are diagrams illustrating, from the perspective of the experience of a user, sub-items displayed when items are selected in the setting screen 1120 according to an embodiment of the disclosure.

Figure 12A:
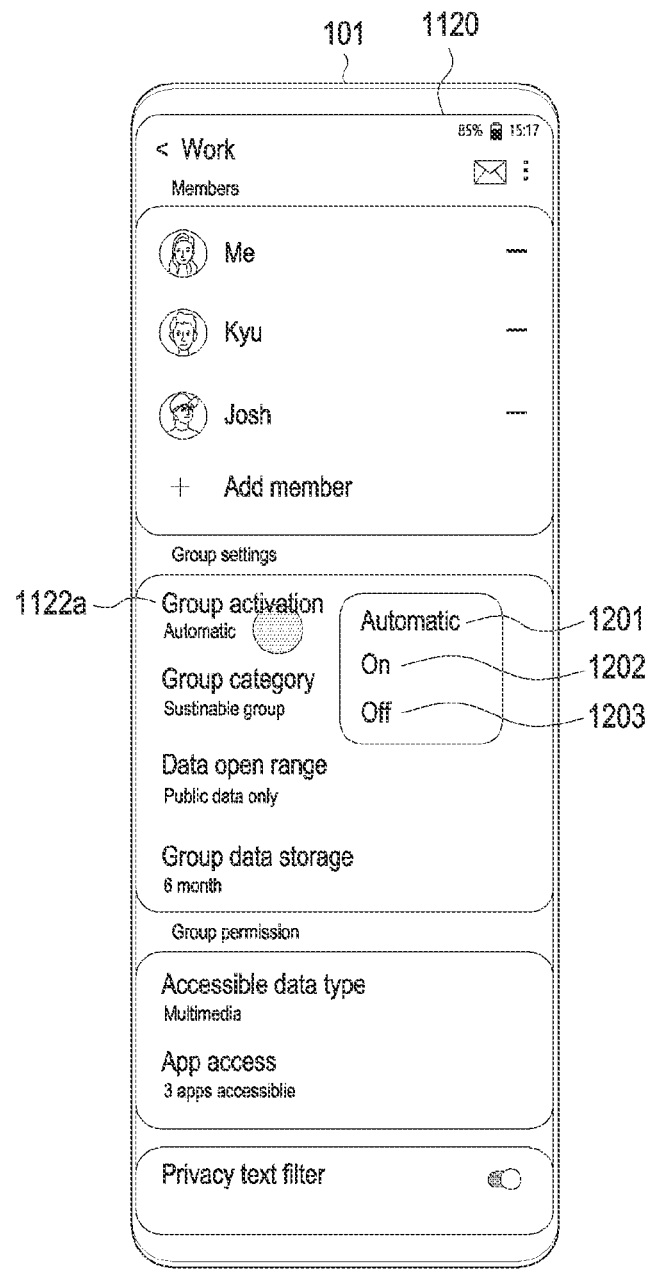
FIGS. 12A, 12B, 12C, 12D, 12E, 12F, 12G, and 12H are diagrams illustrating, from the perspective of the experience of a user, sub-items displayed when items are selected in a setting screen according to an embodiment of the disclosure.
Figure 12B:
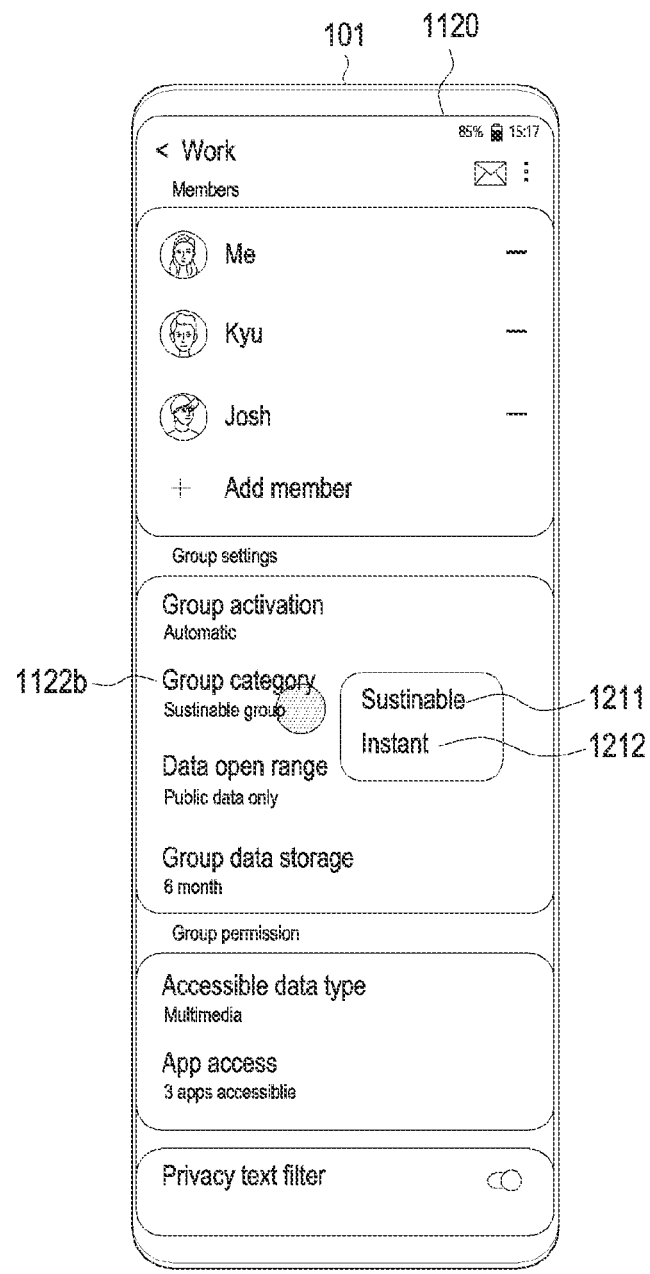
Figure 12C:
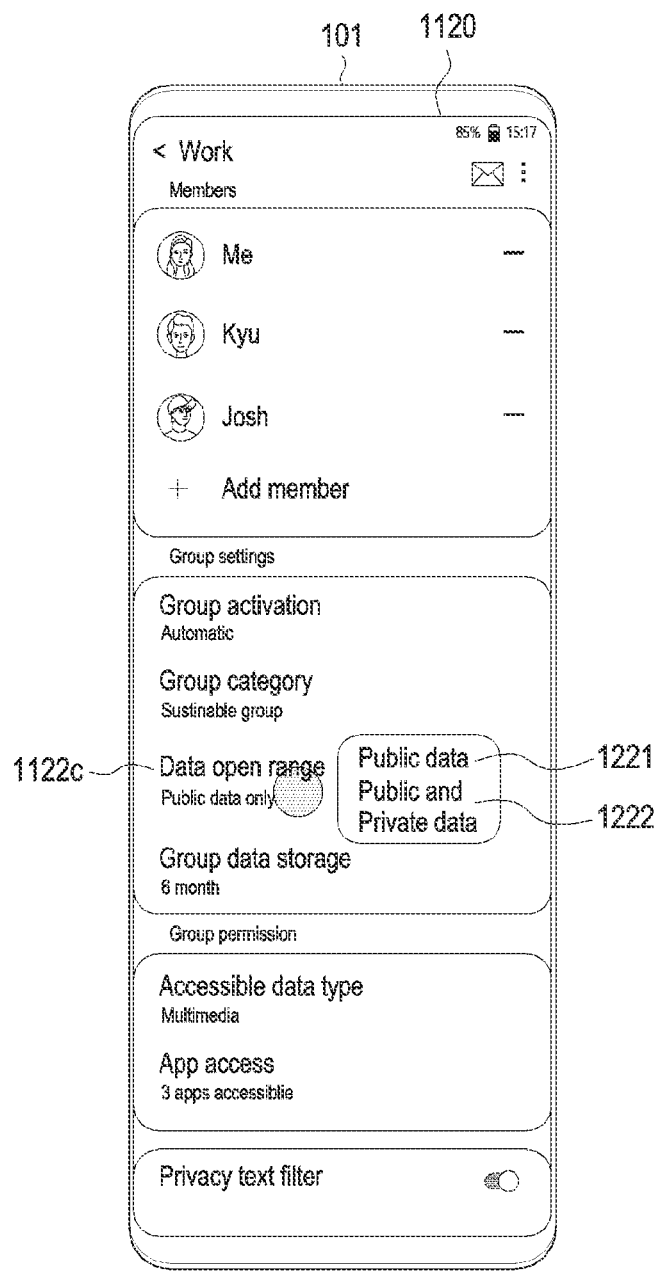
Figure 12D:
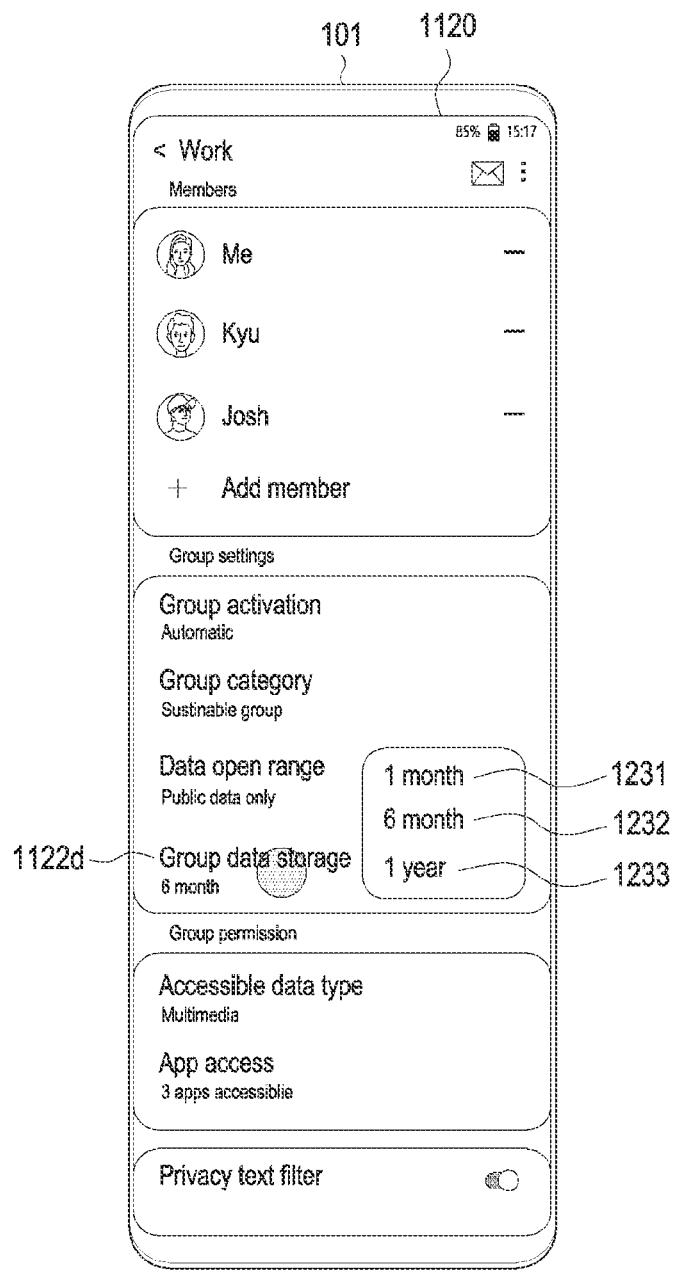
Figures 12E, 12F:
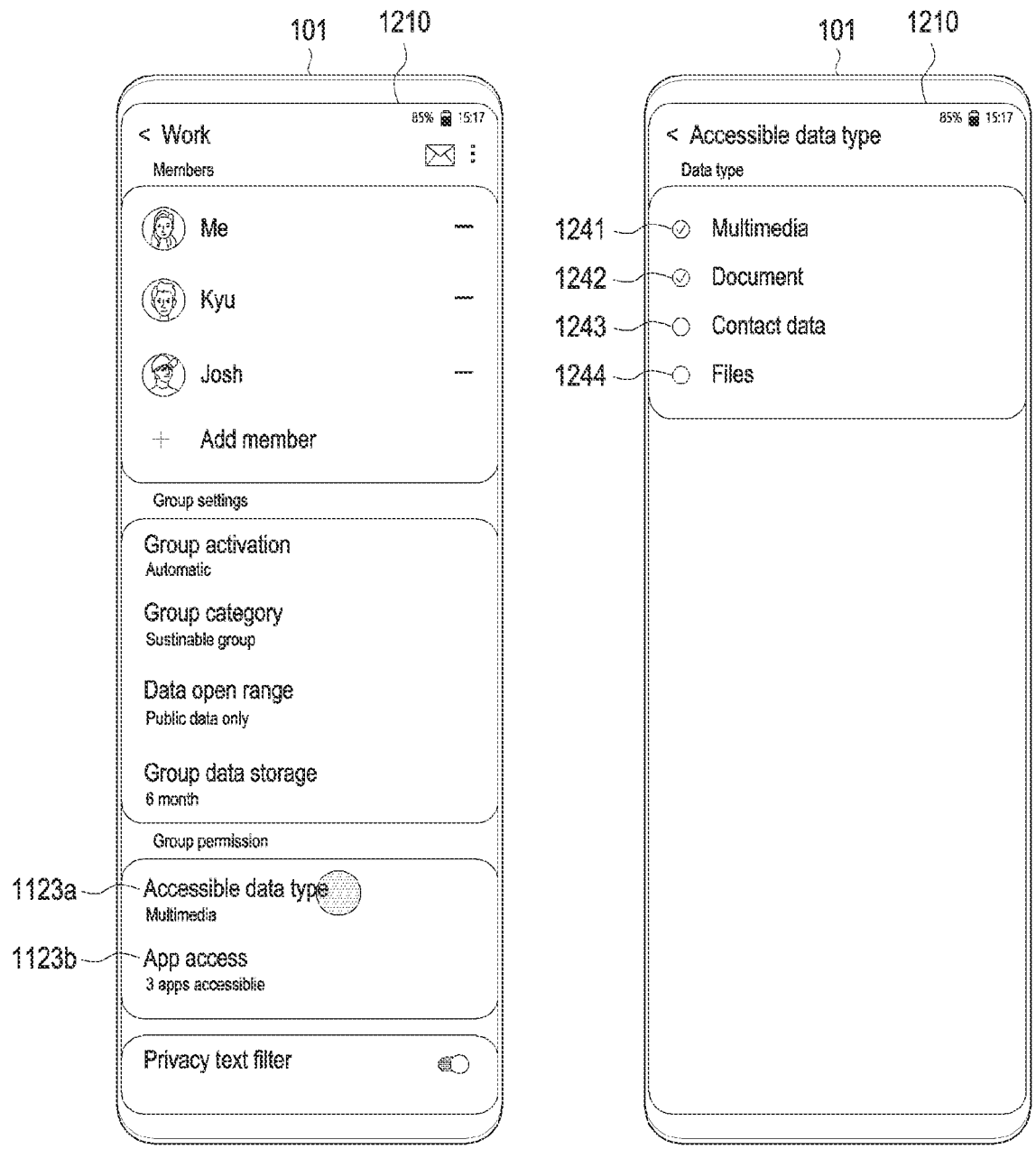
Figure 12G:
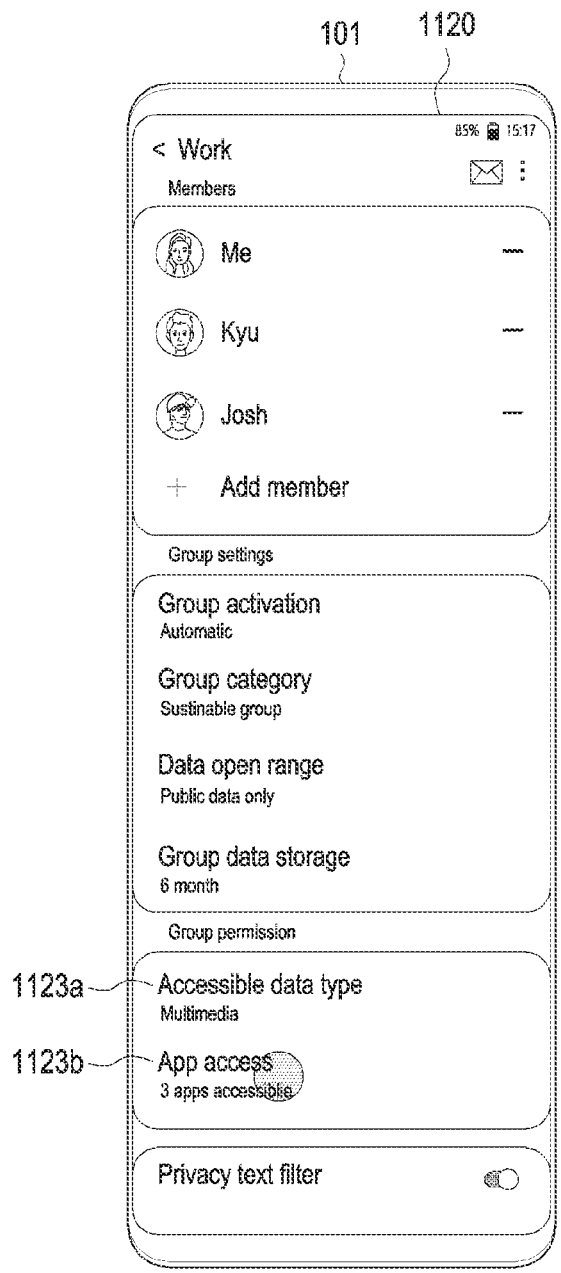
Figure 12H:
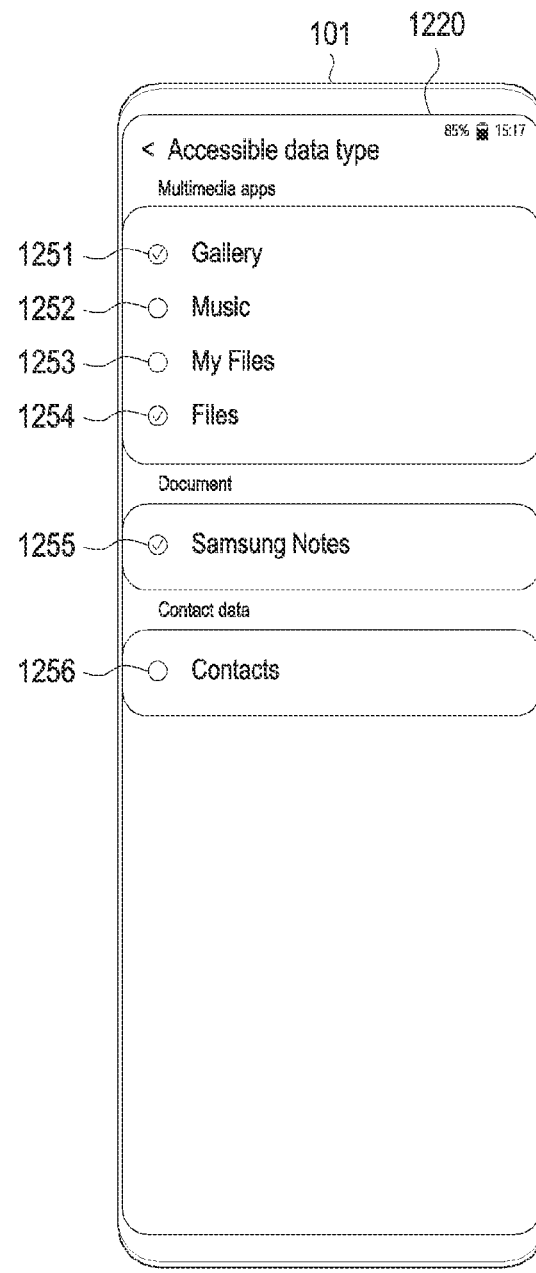

Referring to FIG. 12A, in case the first item 1122a is selected by a user of the electronic device 101 according to an embodiment of the disclosure, sub-items (e.g., a first sub-item 1201, a second sub-item 1202, and a third sub-item 1203) capable of selecting whether to automatically set a group activation function, whether to configure to always provide a group service function, or whether to interrupt provision of a group service function may be displayed. Referring to FIG. 12B, in that the second item 1122b is selected by a user of the electronic device 101 according to an embodiment of the disclosure, sub-items (e.g., a fourth sub-item 1211 and a fifth sub-item 1212) capable of selecting whether to change the type of group to a sustainable group type (e.g., a third type of group or a fourth type of group) or whether to change the type of group to an instant group (e.g., a first type of group or a second type of group) may be displayed. Referring to FIG. 12C, in case the third item 1122c for setting a data open range is selected by a user of the electronic device 101 according to an embodiment of the disclosure, a sixth sub-item 1221 for sharing only public data and a seventh sub-item 1222 for sharing public data and privacy data may be displayed. Referring to FIG. 12D, in case the fourth item 1122d for setting a data storage cycle of data shared among group members is selected by a user of the electronic device 101 according to an embodiment of the disclosure, items (e.g., an eighth sub-item 1231, a ninth sub-item 1232, and/or a tenth sub-item 1233) for selecting a period for sharing may be displayed. Referring to FIGS. 12E and 12F, in case the fifth item 1123a for setting the right to access data is selected by a user of the electronic device 101 according to an embodiment of the disclosure, a fourth screen 1210 including items (e.g., an eleventh sub-item 1241, a twelfth sub-item 1242, a thirteenth sub-item 1243, and/or a fourteenth sub-item 1244) for setting type of accessible data may be displayed as illustrated in FIG. 12F. Referring to FIG. 12G, in case the sixth item 1123b for setting the right to access an application is selected by a user of the electronic device 101 according to an embodiment of the disclosure, items (e.g., a fifteenth sub-item 1251, a sixteenth sub-item 1252, a seventeenth sub-item 1253, an eighteenth sub-item 1254, a ninth sub-item 1255, and/or a twentieth sub-item 1256) for setting type of accessible application may be displayed as illustrated in FIG. 12H.

Figure 13:
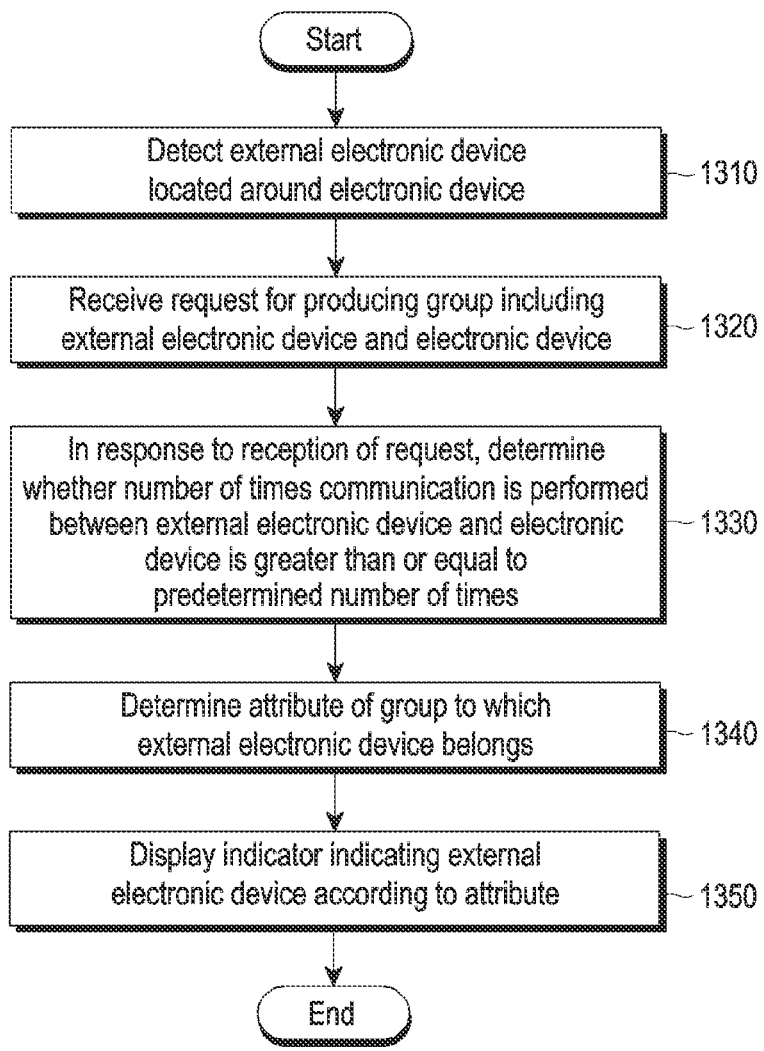
FIG. 13 is a flow diagram illustrating a function or an operation of determining the attribute of a group according to an embodiment of the disclosure.

FIG. 13 is a flow diagram illustrating a function or an operation of determining the attribute of a group according to an embodiment of the disclosure.

Referring to FIG. 13, the electronic device 101 according to an embodiment of the disclosure may detect an external electronic device located around the electronic device 101 in operation 1310. The electronic device 101 according to an embodiment of the disclosure may detect the external electronic device located around the electronic device 101 by using various short-distance communication schemes (e.g., Bluetooth low energy (BLE) and/or ultra wide band (UWB) communication scheme). In the disclosure, the term, "detection" may refer to a function or an operation of setting up a wireless communication channel with at least one external electronic device, and receiving identification information (e.g., an MAC address, a phone number of an external electronic device, a unique identification number (e.g., IMEI) of an external electronic device, and/or a model number (e.g., SM-G980F) of an external electronic device). The electronic device 101 according to an embodiment of the disclosure may periodically perform operation 1310 at predetermined time intervals, or may perform in response to a request from a user of the electronic device 101.

The electronic device 101 according to an embodiment of the disclosure may receive a request for producing a group including the external electronic device and the electronic device 101 in operation 1320. In case the external electronic device is detected, the electronic device 101 according to an embodiment of the disclosure may display a notification 310 indicating that the external electronic device capable of being grouped is detected from around the electronic device 101, as illustrated in FIG. 3A. In case input of selecting the notification 310 is received, the electronic device 101 according to an embodiment of the disclosure may determine the attribute of a group to which the external electronic device belongs.

In operation 1330, in response to reception of the request in operation 1320, the electronic device 101 according to an embodiment of the disclosure may determine whether the number of times of phone number-based communication between the electronic device 101 and the external electronic device (e.g., the number of times of receiving/making a call (e.g., a voice call, video call), the number of times of receiving/sending a text message (SMS), and/or the number of times of receiving/sending an SNS message) is greater than or equal to a predetermined number of times. The electronic device 101 according to an embodiment of the disclosure may perform operation 1330 by determining whether the number of times communication for each of a plurality of types of communication (e.g., a phone call, a text message (SMS), an SNS message) is greater than or equal to a predetermined number of times, or by summing the number of times communication of the plurality of types of communication and determining whether the sum is greater than or equal to a predetermined number of times.

In operation 1340, the electronic device 101 according to an embodiment of the disclosure may determine, based at least on a determination result of operation 1330, the attribute of the group to which at least one external electronic device belongs. In case that the number of times communication is performed between at least one external electronic device and the electronic device 101 is greater than or equal to a predetermined number of times, the electronic device 101 according to an embodiment of the disclosure may determine the type of the group to which the external electronic device belongs as a third type of group (e.g., a sustainable group capable of sharing only public data) or a fourth type of group (e.g., a sustainable group capable of sharing public data and privacy data). In case the number of times communication is performed between the external electronic device and the electronic device 101 is less than the predetermined number of times, the electronic device 101 according to an embodiment of the disclosure may determine the type of a group to which the external electronic device belongs as a first type of group (e.g., an instant group capable of sharing only public data) or a second type of group (e.g., an instant group capable of sharing public data and privacy data).

The electronic device 101 according to an embodiment of the disclosure may display an indicator indicating at least one external electronic device according to the determined attribute in operation 1350.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a touch screen display;
communication circuitry; and
at least one processor,
wherein the at least one processor is configured to:
detect, via the communication circuitry, at least one external electronic device located around the electronic device;
receive a request for producing a group including the at least one external electronic device and the electronic device;
determine whether a number of times communication is performed between the at least one external electronic device and the electronic device is greater than or equal to a first predetermined number of times in response to reception of the request;
determine an attribute of the group to which the at least one external electronic device belongs based on a determination result and designate the attribute as a first type of group that shares data with the at least one external electronic device during a first period; and
display an indicator indicating the at least one external electronic device on the touch screen display according to the determined attribute of the group,
wherein the at least one processor is further configured to:
determine whether a current location of the electronic device substantially corresponds to a predetermined location stored in the electronic device; and
determine the attribute in case the current location substantially corresponds to the predetermined location based at least on whether the electronic device is located in the current location at least a second predetermined number of times and whether the number of times communication is performed between the at least one external electronic device and the electronic device is greater than or equal to the first predetermined number of times, and
wherein the at least one processor is allowed to access only data designated as public data based at least on determining that the current location does not substantially correspond to the predetermined location.

2. The electronic device of claim 1, wherein the at least one processor is further configured to determine the attribute based at least on whether identification information of the at least one external electronic device corresponds to identification information included in a contact list stored in memory of the electronic device and whether the number of times communication is performed between the at least one external electronic device and the electronic device is greater than or equal to the first predetermined number of times.

3. The electronic device of claim 1, wherein the at least one processor is further configured to determine the attribute based at least on whether a number of times the at least one external electronic device is detected is greater than or equal to a third predetermined number of times and whether the number of times communication is performed between the at least one external electronic device and the electronic device is greater than or equal to the first predetermined number of times.

4. The electronic device of claim 1, wherein the at least one processor is further configured to designate the attribute as a second type of group that shares data with the at least one external electronic device during a first period and allows the at least one external electronic device to access public data and privacy data based at least on determining that the current location corresponds to the predetermined location and the number of times communication is performed between the at least one external electronic device and the electronic device is less than the first predetermined number of times.

5. The electronic device of claim 3, wherein the at least one processor is further configured to designate the attribute as a third type of group that shares data with the at least one external electronic device during a second period and allows the at least one external electronic device to access only data designated as public data based at least on determining that the current location substantially corresponds to a predetermined location stored in the electronic device and the number of times the at least one external electronic device is detected is less than the third predetermined number of times.

6. The electronic device of claim 3, wherein the at least one processor is further configured to designate the attribute as a fourth type of group that shares data with the at least one external electronic device during a second period and allows the at least one external electronic device to access data designated as public data and privacy data based at least on determining that the current location substantially corresponds to a predetermined location stored in the electronic device and the number of times the at least one external electronic device is detected is greater than or equal to the third predetermined number of times.

7. The electronic device of claim 1, wherein the at least one processor is further configured to, in case the at least one external electronic device is a plurality of external electronic devices and is grouped into a single group, display the plurality of detected external electronic devices as a single group on the touch screen display.

8. The electronic device of claim 1, wherein the at least one processor is further configured to display an indicator indicating at least one sub-electronic device that is operatively connected to the at least one detected external electronic device on the touch screen display.

9. A method of controlling an electronic device, the method comprising:
   detecting at least one external electronic device located around the electronic device;
   receiving a request for producing a group including the at least one external electronic device and the electronic device;
   determining whether a number of times communication is performed between the at least one external electronic device and the electronic device is greater than or equal to a first predetermined number of times in response to reception of the request;
   determining an attribute of the group to which the at least one external electronic device belongs based on at least a determination result;
   designating the attribute as a first type of group that shares data with the at least one external electronic device during a first period; and
   displaying an indicator indicating the at least one external electronic device on a touch screen display of the electronic device according to the determined attribute,
   wherein the at least one external electronic device is allowed to access only data designated as public data based at least on determining that a current location of the electronic device does not substantially correspond to a predetermined location.

10. The method of claim 9, further comprising:
    determining the attribute based at least on whether identification information of the at least one external electronic device corresponds to identification information included in a contact list stored in memory of the electronic device and whether the number of times communication is performed between the at least one external electronic device and the electronic device is greater than or equal to the first predetermined number of times.

11. The method of claim 9, further comprising:
    determining whether a current location of the electronic device substantially corresponds to a predetermined location stored in the electronic device; and
    in case the current location substantially corresponds to the predetermined location, determining the attribute based at least on whether the electronic device is located in the current location at least a second predetermined number of times and whether the number of times communication is performed between the at least one detected external electronic device and the electronic device is greater than or equal to the first predetermined number of times.

12. The method of claim 9, further comprising:
    determining the attribute based at least on whether a number of times that the at least one external electronic device is detected is greater than or equal to a third predetermined number of times and whether the number of times communication is performed between the at least one external electronic device and the electronic device is greater than or equal to the first predetermined number of times.

13. A method of controlling an electronic device, the method comprising:
    detecting an external electronic device located around the electronic device;
    receiving a request for producing a group including the external electronic device and the electronic device;
    determining whether a number of times communication is performed between the external electronic device and the electronic device is greater than or equal to a first predetermined number of times in response to reception of the request;
    determining an attribute of the group based on at least a determination result;
    designating the attribute as a first type of group that shares data with the at least one external electronic device during a first period; and
    displaying an indicator indicating the external electronic device on the electronic device according to the determined attribute,
    wherein the external electronic device is allowed to access only data designated as public data based on determining that a current location of the electronic device does not substantially correspond to a predetermined location.

14. The method of claim 13, further comprising:
    determining the attribute based on identification information of the external electronic device corresponding to identification information included in a contact list of the electronic device and whether the number of times communication is performed between the external electronic device and the electronic device is greater than or equal to the first predetermined number of times.

15. The method of claim 13, further comprising:
    determining whether a current location of the electronic device substantially corresponds to a predetermined location; and
    in case the current location substantially corresponds to the predetermined location, determining the attribute based on whether the external electronic device is located in the current location at least a second predetermined number of times and whether the number of times communication is performed between the external electronic device and the electronic device is greater than or equal to the first predetermined number of times.

16. The method of claim 13, further comprising:
determining the attribute based on whether a number of times the external electronic device is detected is greater than or equal to a third predetermined number of times and whether the number of times communication is performed between the external electronic device and the electronic device is greater than or equal to the first predetermined number of times.

* * * * *